US012717841B2

(12) United States Patent
Dumas et al.

(10) Patent No.: US 12,717,841 B2
(45) Date of Patent: Aug. 25, 2026

(54) SYSTEMS AND METHODS FOR FILTERING LARGE AUDIO LIBRARIES USING PERCEPTIVE DISTRIBUTION BINNING

(71) Applicant: MIIR AUDIO TECHNOLOGIES, INC., Brooklyn Park, MN (US)

(72) Inventors: Roger Dumas, Wayzata, MN (US); Jon Beck, Minneapolis, MN (US); Aaron Prust, Crystal, MN (US); Gary Katz, Yonkers, NY (US); Paul J. Moe, Minnetonka, MN (US); Daniel J. Levitin, Los Angeles, CA (US)

(73) Assignee: MIIR AUDIO TECHNOLOGIES, INC., Brooklyn Park, MN (US)

( * ) Notice: Subject to any disclaimer, the term of this patent is extended or adjusted under 35 U.S.C. 154(b) by 139 days.

(21) Appl. No.: 18/593,844

(22) Filed: Mar. 1, 2024

(65) Prior Publication Data

US 2024/0296182 A1 Sep. 5, 2024

Related U.S. Application Data

(60) Provisional application No. 63/449,183, filed on Mar. 1, 2023.

(51) Int. Cl.
*G06F 16/61* (2019.01)
*G06F 16/635* (2019.01)

(52) U.S. Cl.
CPC ............ *G06F 16/61* (2019.01); *G06F 16/635* (2019.01)

(58) Field of Classification Search
CPC ... G06F 16/61; G06F 16/635; H04N 21/4394; H04N 21/233

(Continued)

(56) References Cited

U.S. PATENT DOCUMENTS 10,966,007 B1 3/2021 Fenner et al.
11,635,934 B2 4/2023 Dumas et al.
(Continued)

FOREIGN PATENT DOCUMENTS

CN 107802938 B 4/2021
EP 3644306 B1 5/2022
(Continued)

OTHER PUBLICATIONS

Li, et al. Listening to music in a risk-reward context: The roles of the temporoparietal junction and the orbitofrontal/insular cortices in reward-anticipation, reward-gain, and reward-loss. Brain Research, 1629. 2015.

(Continued)

*Primary Examiner* — Duc Nguyen
*Assistant Examiner* — Chimezie Ezeriwe Bekee
(74) *Attorney, Agent, or Firm* — Barnes & Thornburg LLP

(57) ABSTRACT

System and methods for filtering and sorting libraries of audio data and quantitatively processing audio data to generate metrics for use in filtering and sorting methods based on distribution bins that are, for example, derived using human listening perception. Examples include calculating composite metrics based on values of objective audio metrics for individual audio files of a large audio library, each objective audio metrics generating a distribution of values. Examples include assigning three or more bins for each value of the objective audio metrics such that the bins represent perceptually distinct groups and, for each composite metric, combining the bins of each objective audio metric of the composite metric to generate corresponding distribution bins of the values of the composite metric for the large audio library. Examples include filtering the large
(Continued)

audio library using corresponding distribution bins for a plurality of distinct composite metrics.

16 Claims, 12 Drawing Sheets

(58) Field of Classification Search
USPC ........................................................ 700/94
See application file for complete search history.

(56) References Cited

U.S. PATENT DOCUMENTS

| | | | | |
|---|---|---|---|---|
| 2004/0190633 | A1* | 9/2004 | Ali | H04N 17/004 375/240.01 |
| 2005/0143974 | A1 | 6/2005 | Joly | |
| 2006/0150072 | A1 | 7/2006 | Salvucci | |
| 2011/0225153 | A1 | 9/2011 | Haseyama | |
| 2012/0024130 | A1 | 2/2012 | Takahashi et al. | |
| 2013/0091167 | A1 | 4/2013 | Bertin-Mahieux et al. | |
| 2014/0307878 | A1 | 10/2014 | Osborne et al. | |
| 2016/0210951 | A1 | 7/2016 | Rutledge et al. | |
| 2016/0293180 | A1 | 10/2016 | Ur et al. | |
| 2017/0148468 | A1 | 5/2017 | Kim et al. | |
| 2018/0308382 | A1* | 10/2018 | Koren | G09B 15/02 |
| 2019/0022351 | A1 | 1/2019 | McCarthy et al. | |
| 2019/0215540 | A1 | 7/2019 | Nicol et al. | |
| 2019/0341010 | A1* | 11/2019 | Wipperfürth | G10H 1/0008 |
| 2019/0394578 | A1 | 12/2019 | Dehghani et al. | |
| 2020/0365125 | A1 | 11/2020 | Senn | |
| 2021/0338973 | A1 | 11/2021 | Poltorak | |
| 2022/0272454 | A1* | 8/2022 | Seefeldt | G10L 25/78 |
| 2022/0398063 | A1* | 12/2022 | Dumas | G06F 3/16 |
| 2024/0078073 | A1 | 3/2024 | Dumas et al. | |

FOREIGN PATENT DOCUMENTS

| | | | | |
|---|---|---|---|---|
| JP | 2012108451 | A | 6/2012 | |
| WO | 2001069575 | A1 | 9/2001 | |
| WO | 2019097236 | A1 | 5/2019 | |
| WO | 2021168563 | A1 | 9/2021 | |
| WO | WO-2021259842 | A1 * | 12/2021 | G10L 25/30 |

OTHER PUBLICATIONS

Lin, et al. Early evaluation of the therapeutic effectiveness in children with epilepsy by quantitative EEG: A model of Mozart K.448 listening-a preliminary study. Epilepsy Research, 108(8), 1417-1426. 2014.
Lin, et al. Increasing fMRI Sampling Rate Improves Granger Causality Estimates. PLoS One, 9(6), e100319. 2014.
Lin, et al. Mozart K.448 acts as a potential add-on therapy in children with refractory epilepsy. Epilepsy and Behavior, 20(3), 490-493. 2011.
Liu, et al. Spatial Connectivity and Temporal Dynamic Functional Network Connectivity of Musical Emotions Evoked by Dynamically Changing Tempo. Frontiers in Neuroscience, 0, 940. 2021.
Lloyd. The Musical Structure of Time in the Brain: Repetition, Rhythm, and Harmony in fMRI During Rest and Passive Movie Viewing. Frontiers in Computational Neuroscience, 13, 98. 2020.
Lochte, et al. An fMRI investigation of the neural correlates underlying the autonomous sensory meridian response (ASMR). Biolmpacts, 8(4), 295-304. 2018.
Locsin. The effect of music on the pain of selected post-operative patients. Journal of Advanced Nursing, 6(1), 19-25. 1981.
Lumaca, et al. Weighting of neural prediction error by rhythmic complexity: A predictive coding account using mismatch negativity. European Journal of Neuroscience, 49(12), 1597-1609. 2019.
Madison, et al. Repeated listening increases the liking for music regardless of its complexity: Implications for the appreciation and aesthetics of music. Frontiers in Neuroscience, Mar. 2017.
Mallik, et al. Anhedonia to music and mu-opioids: Evidence from the administration of naltrexone. Scientific Reports, 7, 41952. 2017.
Martínez-Molina, et al. Resting-State Network. 2021.
Maruskin, et al. The chills as a psychological construct: Content universe, factor structure, affective composition, elicitors, trait antecedents, and consequences. Journal of Personality and Social Psychology, 103(1), 135-157. 2012.
Mas-Herrero, et al. Common and distinct neural correlates of music and food-induced pleasure: A coordinate-based meta-analysis of neuroimaging studies. In Neuroscience and Biobehavioral Reviews (vol. 123, pp. 61-71). Elsevier Ltd. 2021.
Matthews, et al. The sensation of groove engages motor and reward networks. Neurolmage, 214, 116768. 2020.
McDermott, et al. Individual differences reveal the basis of consonance. Current Biology□: CB, 20(11), 1035-1041. 2010.
Mcmullen, et al. Music and Language: A Developmental Comparison. Music Perception, 21(3), 289-311. 2004.
Menninghaus, et al. Towards a psychological construct of being moved. PLoS One, 10(6). 2015.
Menon, et al. The rewards of music listening: Response and physiological connectivity of the mesolimbic system. Neurolmage, 28(1), 175-184. 2005.
Merrill, et al. Locus of emotion influences psychophysiological reactions to music. PLOS One, 15(8), e0237641. 2020.
Miles, et al. A statistical analysis of the relationship between harmonic surprise and preference in popular music. Frontiers in Human Neuroscience, 11(May), 1-13. 2017.
Miles, et al. What to Expect When the Unexpected Becomes Expected: Harmonic Surprise and Preference Over Time in Popular Music. Frontiers in Human Neuroscience, Apr. 15, 2021.
Morgan, et al. Statistical learning and Gestalt-like principles predict melodic expectations. Cognition, 189, 23-34. 2019.
Mori, et al. Two types of peak emotional responses to music: The psychophysiology of chills and tears. Scientific Reports, 7. 2017.
MRC Data's 2021 U.S. Year-End Report—MRC Data Reports. Retrieved Feb. 9, 2022. url: <https://mrcdatareports.com/mrc-data-2021-u-s-year-end-report/>.
Müller, et al. Signal Processing for Music Analysis. IEEE Journal of Selected Topics in Signal Processing, 0(0), 1. 2011.
Musical "Chills" among Topics of Music Therapy Symposium | Berklee College of Music. (n.d.). Retrieved Oct. 14, 2020. url: <https://www.berklee.edu/berklee-today/berklee-today-spring-2002/musical-"chills"-among-topics-music-therapy-symposium>.
Nagel, et al. Psychoacoustical correlates of musically induced chills. Musicae Scientiae, 12(1), 101-113. 2008.
Nemati, et al. Lost in music: Neural signature of pleasure and its role in modulating attentional resources. Brain Research, 1711, 7-15. 2019.
Núñez, et al. What happened to cognitive science? Nature Human Behaviour, 3(8), 782-791. 2019.
Nusbaum, et al. Shivers and timbres: Personality and the experience of chills from music. Social Psychological and Personality Science. 2011.
Obleser, et al. Neural Entrainment and Attentional Selection in the Listening Brain. Trends in Cognitive Sciences, 23 (11), 913-926. 2019.
Ooishi, et al. Increase in salivary oxytocin and decrease in salivary cortisol after listening to relaxing slow-tempo and exciting fast-tempo music. PLoS One, 12(12). 2017.
Pando-Naude, et al. Functional connectivity of music-induced analgesia in fibromyalgia. Scientific Reports, 9(1), 1-17. 2019.
Panksepp, et al. Emotional sounds and the brain: The neuro-affective foundations of musical appreciation. Behavioural Processes, 60(2), 133-155. 2002.
Panksepp. The Emotional Sources of "Chills" Induced by Music. Music Perception: An Interdisciplinary Journal, 13(2), 171-207. 1995.
Park, et al. Differences between musicians and non-musicians in neuro-affective processing of sadness and fear expressed in music. Neuroscience Letters, 566C, 120-124. 2014.
Parker, et al. Positive and Negative Hedonic Contrast With Musical Stimuli. Psychology of Aesthetics, Creativity, and the Arts, 2(3), 171-174. 2008.

(56) References Cited

OTHER PUBLICATIONS

Parncutt. The Tonic as Triad: Key Profiles as Pitch Salience Profiles of Tonic Triads. Music Perception: An Interdisciplinary Journal, 28(4), 333-366. 2011.
Paul. Using verbal reports to investigate children's aesthetic experiences with music. Journal of Music Therapy, 45(4). 2008.
Pearce. Statistical learning and probabilistic prediction in music cognition: Mechanisms of stylistic enculturation. Annals of the New York Academy of Sciences, 1423(1), 378-395. 2018.
Pereira, et al. Music and Emotions in the Brain: Familiarity Matters. PLoS One, 6(11), e27241. 2011.
Peretz, et al. Brain organization for music processing. Annual Review of Psychology, 56, 89-114. 2005.
Popescu, et al. Western listeners detect boundary hierarchy in Indian music: a segmentation study. Music Perception: An Interdisciplinary Journal, 17(1), 43-64. 1999.
PsyArXiv Preprints | Chills in music: An integrative review. (n.d.). Retrieved Nov. 24, 2020. url: <https://psyarxiv.com/yc6d8/>.
Quinn. A Unified Theory of Chord Quality in Equal Temperaments. 122. 2004.
Quiroga-Martinez, et al. Decomposing neural responses to melodic surprise in musicians and non-musicians: Evidence for a hierarchy of predictions in the auditory system. Neurolmage, 215. 2020.
Ramos, et al. Sleep and neurocognitive decline in the Hispanic Community Health Study/Study of Latinos. Alzheimer's and Dementia, 16(2), 305-315. 2020.
Randall, et al. Similarity measures for tonal models. In R. C. Mario Baroni, Anna Rita Addessi & Marco Costa (Eds.), 9th International Conference on Music Perception and Cognition: Perception II (p. 255). 2006.
A mixed-methods examination of autonomous sensory meridian response: Comparison to frisson—ScienceDirect. (n.d.). Retrieved Mar. 22, 2021. url: <https://www.sciencedirect.com/science/article/abs/pii/S1053810020305134?via%3Dihub>.
A Spotify playlist with 715 songs known to give people chills—Quartz. (n.d.). Retrieved Nov. 2, 2021. url: <https://qz.com/2071652/a-spotify-playlist-with-715-songs-known-to-give-people-chills/>.
Albouy, et al. Distinct sensitivity to spectrotemporal modulation supports brain asymmetry for speech and melody. Science, 367(6481), 1043-1047. 2020.
Alluri, V., et al. Large-scale brain networks emerge from dynamic processing of musical timbre, key and rhythm. Neurolmage, 59(4), 3677-3689. 2012.
Anderson, et al. "Just the Way You Are": Linking Music Listening on Spotify and Personality. Social Psychological and Personality Science, 12(4), 561-572. 2021.
Atasoy, et al. Human brain networks function in connectome-specific harmonic waves. Nature Communications, 7. 2016.
Bannister, et al. Suppressing the chills: Effects of musical manipulation on the chills response. Frontiers in Psychology, 9(Oct). 2018.
Bannister. Distinct varieties of aesthetic chills in response to multimedia. Plos One, 14(11), e0224974. 2019.
Bannister. A survey into the experience of musically induced chills: Emotions, situations and music. Psychology of Music, 48(2), 297-314. 2020.
Bannister. A Vigilance Explanation of Musical Chills? Effects of Loudness and Brightness Manipulations. Music & Science, 3, 205920432091565. 2020.
Bartlett. Effect of repeated listenings on structural discrimination and affective response. Journal of Research in Music Education, 21(4), 302-317. 1973.
Batt-Rawden. The benefits of self-selected music on health and well-being. Arts in Psychotherapy, 37(4), 301-310. 2010.
Beier, et al. Do You Chill When I Chill? A Cross-Cultural Study of Strong Emotional Responses to Music. Psychology of Aesthetics, Creativity, and the Arts. 2020.
Benedek, et al. Objective and continuous measurement of piloerection. Psychophysiology, 47(5), 989-993. 2010.
Benedek, et al. Physiological correlates and emotional specificity of human piloerection. Biological Psychology, 86(3), 320-329. 2011.
Bezdek, et al. The effect of visual and musical suspense on brain activation and memory during naturalistic viewing. Biological Psychology, 129. 2017.
Big Five Inventory (BFI). 51(4), 65-66. 1998.
Bigliassi, et al. Cerebral effects of music during isometric exercise: An fMRI study. International Journal of Psychophysiology, 133(Jul. ), 131-139. 2018.
Blood, et al. Emotional responses to pleasant and unpleasant music correlate with activity in paralimbic brain regions. Nature Neuroscience, 2(4), 382-387. 1999.
Blood, et al. Intensely pleasurable responses to music correlate with activity in brain regions implicated in reward and emotion. Proceedings of the National Academy of Sciences of the United States of America, 98(20), 11818-11823. 2001.
Burgoyne, et al. An expert ground-truth set for audio chord recognition and music analysis. Proceedings of the 12th International Society for Music Information Retrieval Conference, ISMIR 2011, Ismir, 633-638. 2011.
Chabin, et al. Cortical Patterns of Pleasurable Musical Chills Revealed by High-Density EEG. Frontiers in Neuroscience, 14, 1114. 2020.
Cheung, et al. Uncertainty and Surprise Jointly Predict Musical Pleasure and Amygdala , Hippocampus , and Auditory Cortex Activity. Current. 2019.
Clynes, et al. Music, Mind, and Brain: The Neuropsychology of Music (book review). Acoustical Society of America Journal, 75, 1308-1309. 1984.
Colver, et al. Getting aesthetic chills from music: The connection between openness to experience and frisson. Psychology of Music. 2015.
Corrêa, et al. A survey on symbolic data-based music genre classification. In Expert Systems with Applications (vol. 60, pp. 190-210). Elsevier Ltd. 2016.
Cowen, et al. What music makes US feel: At least 13 dimensions organize subjective experiences associated with music across different cultures. Proceedings of the National Academy of Sciences of the United States of America, 117 (4), 1924-193. 2020.
Craig. An Exploratory Study of Physiological Changes during "Chills" Induced by Music. Musicae Scientiae, 9(2), 273- 287. 2005.
Daly, et al. Neural and physiological data from participants listening to affective music. Scientific Data, 7(1), 1-7. 2020.
De Fleurian, et al. Chills in music: An integrative review. 2020.
De Fleurian, et al. Effects of stimulus properties, stylistic preference and familiarity on musical chills. Conference poster - Queen Mary University of London. 2019.
De Fleurian, et al. The Relationship Between Valence and Chills in Music: A Corpus Analysis. 12(4), 1-11. 2021.
De Rosis, et al. From Greta's mind to her face: Modelling the dynamics of affective states in a conversational embodied agent. International Journal of Human Computer Studies, 59(1-2), 81-118. 2003.
De Witte, et al. Effects of music interventions on stress-related outcomes: a systematic review and two meta-analyses. Health Psychology Review, 14(2), 294-324. 2020.
Dunbar, et al. Cochlear SGN neurons elevate pain thresholds in response to music. Scientific Reports, 1-8. 2021.
Ebishima, et al. Relationship of the Acoustic Startle Response and Its Modulation to Adaptive and Maladaptive Behaviors in Typically Developing Children and Those With Autism Spectrum Disorders: A Pilot Study. 2019.
Eerola, et al. An integrative review of the enjoyment of sadness associated with music. Physics of Life Reviews, 25, 100-121. 2018.
Eerola. Are the Emotions Expressed in Music Genre-specific? An Audio-based Evaluation of Datasets Spanning Classical, Film, Pop and Mixed Genres. Journal of New Music Research, 40(4), 349-366. 2011.
European Examination Report for Application No. 22744556.6 dated Nov. 26, 2025 ( 9 pages).
Færøvik, et al. Suppression, Maintenance, and Surprise: Neuronal Correlates of Predictive Processing Specialization for Musical Rhythm. Frontiers in Neuroscience, 0, 862. 2021.

(56) References Cited

OTHER PUBLICATIONS

Farris, et al. Musical Prosody-Driven Emotion Classification: Interpreting Vocalists Portrayal of Emotions Through Machine Learning. Proceedings of the 18th Sound and Music Computing Conference, Jun. 29-Jul. 1, 2021.
Fauvel, et al. Neural implementation of musical expertise and cognitive transfers: could they be promising in the framework of normal cognitive aging? Frontiers in Human Neuroscience, 7(Oct.), 693. 2013.
Forsthofer, et al. Frequency modulation of rattlesnake acoustic display affects acoustic distance perception in humans. 2021.
Forth, et al. Entraining IDyOT: Timing in the information dynamics of thinking. Frontiers in Psychology, 7(Oct.) 2016.
Fredborg, et al. Mindfulness and autonomous sensory meridian response (ASMR). PeerJ, 6, e5414. 2018.
Freitas, et al. Neural correlates of familiarity in music listening: A systematic review and a neuroimaging meta-analysis. In Frontiers in Neuroscience (vol. 12, Issue Oct.) 2018.
Fricke, et al. Computer-based music feature analysis mirrors human perception and can be used to measure individual music preference. Journal of Research in Personality, 75, 94-102. 2018.
Fricke, et al. Measuring musical preferences from listening behavior: Data from one million people and 200,000 songs. Psychology of Music, 030573561986828. 2019.
Garrido, et al. Moody melodies: Do they cheer us up? A study of the effect of sad music on mood. Psychology of Music, 43(2). 2015.
Garrido, et al. Musical prescriptions for mood improvement: An experimental study. Arts in Psychotherapy, 51. 2016.
Wassiliwizky, et al. Art-elicited chills indicate states of being moved. Psychology of Aesthetics, Creativity, and the Arts, 9(4), 405-416. 2015.
Wassiliwizky, et al. Tears falling on goosebumps: Co-occurrence of emotional lacrimation and emotional piloerection indicates a psychophysiological climax in emotional arousal. Frontiers in Psychology, 8(Feb.) 2017.
Wesseldijk, et al. Does listening to music increase your ability to discriminate musical sounds? Personality and Individual Differences, 161. 2020.
Weth, et al. Ambivalent Emotions in Music: We Like Sad Music When It Makes US Happy. Proceedings of the 3rd International Conference on Music & Emotion (ICME3). 2013.
White, et al. Emotion response and regulation to "happy" and "sad" music stimuli: Partial synchronization of subjective and physiological responses. Musicae Scientiae, 20(1). 2016.
Xing, et al. Exposure to Mozart music reduces cognitive impairment in pilocarpine-induced status epilepticus rats. Cognitive Neurodynamics, 10(1), 23-30. 2016.
Xu, et al. Long-term music adjuvant therapy enhances the efficacy of sub-dose antiepileptic drugs in temporal lobe epilepsy. CNS Neuroscience & Therapeutics, cns. 13623. 2021.
Zacharakis, et al. Conceptual blending in music cadences: A formal model and subjective evaluation. Proceedings of the 16th International Society for Music Information Retrieval Conference, ISMIR 2015.
Zatorre. Music, the food of neuroscience? In Nature (vol. 434, Issue 7031, pp. 312-315). 2005.
Zhou, et al. Music-induced emotions influence intertemporal decision making. 1995331, 1-19. 2021.
Rentfrow, et al. The structure of musical preferences: A five-factor model. Journal of Personality and Social Psychology, 100(6), 1139-1157. 2011.
Researchers Just Compiled the Ultimate Playlist of Songs That Will Give You Chills | Inc.com. (n.d.). Retrieved Nov. 2, 2021. url: <https://www.inc.com/jessica-stillman/music-mood-happiness-focus.html>.
Roberts, et al. A mixed-methods examination of autonomous sensory meridian response: Comparison to frisson. Consciousness and Cognition, 86, 103046. 2020.
Roberts, et al. Autonomous sensory meridian response: Scale development and personality correlates. Psychology of Consciousness: Theory Research, and Practice, 6(1), 22-39. 2019.
Rogenmoser, et al. Independent component processes underlying emotions during natural music listening. Social Cognitive and Affective Neuroscience. 2016.
Sachs, et al. Brain connectivity reflects human aesthetic responses to music. Social Cognitive and Affective Neuroscience, 11(6), 884-891. 2016.
Sachs, et al. Dynamic intersubject neural synchronization reflects affective responses to sad music. Neurolmage, 218 (Jun. 2019), 116512. 2020.
Salimpoor, et al. Anatomically distinct dopamine release during anticipation and experience of peak emotion to music. Nature Neuroscience, 14(2), 257-262. 2011.
Salimpoor, et al. Interactions between the nucleus accumbens and auditory cortices predict music reward value. Science, 340(6129), 216-219. 2013.
Sallavanti, et al. The role of complexity in music uses. Psychology of Music, 44(4). 2016.
Schaefer. Music-evoked emotions-Current studies. In Frontiers in Neuroscience (vol. 11) Nov. 2017.
Schäfer, et al. Can personality traits predict musical style preferences? A meta-analysis. Personality and Individual Differences, 116, 265-273. 2017.
Schäfer, et al. How music changes our lives: A qualitative study of the long-term effects of intense musical experiences. Psychology of Music, 42(4), 525-544. 2014.
Schuller. Speech emotion recognition: Two decades in a nutshell, benchmarks, and ongoing trends. Communications of the ACM, 61(5), 90-99. 2018.
Sears, et al. Expectations for tonal cadences: Sensory and cognitive priming effects. Quarterly Journal of Experimental Psychology, 72(6). 2019.
Serrà, et al. Measuring the Evolution of Contemporary Western Popular Music. 2012.
Shifriss, et al. When you're down and troubled: Views on the regulatory power of music. Psychology of Music, 43(6). 2015.
Silva, et al. Domain-Specific Expectations in Music Segmentation. Brain Sciences, 9(7), 169. 2019.
Silvia, et al. On personality and piloerection: Individual differences in aesthetic chills and other unusual aesthetic experiences. Psychology of Aesthetics, Creativity, and the Arts, 5(3), 208-214. 2011.
Singer, et al. Common modulation of limbic network activation underlies musical emotions as they unfold. Neurolmage, 141. 2016.
Sloboda, et al. Music Structure and Emotional Response: Some Empirical Findings. In Psychology of Music (vol. 19, Issue 2, pp. 110-120). 1991.
Smolen, et al. The Effect of Self-Selected Music during Colonoscopy on Anxiety, Heart Rate, and Blood Pressure. Applied Nursing Research, 15(3), 126-136. 2002.
Son, et al. The effects of self-selected music on anxiety and pain during burn dressing changes. Taehan Kanho Hakhoe Chi, 36(1), 159-168. 2006.
Sridharan, et al. A critical role for the right fronto-insular cortex in switching between central-executive and default-mode networks. Proceedings of the National Academy of Sciences of the United States of America, 105(34), 12569- 12574. 2008.
Sridharan, et al. Neural Dynamics of Event Segmentation in Music: Converging Evidence for Dissociable Ventral and Dorsal Networks. Neuron, 55(3), 521-532. 2007.
Srinivasa Murthy, et al. Content-based music information retrieval (CB-MIR) and its applications toward the music industry: A review. ACM Computing Surveys, 51(3). 2018.
Starr. Music therapy in hospice care. In American Journal of Hospice and Palliative Medicine (vol. 16, Issue 6, pp. 739-742). 1999.
Štillová, et al. Mozart effect in epilepsy: Why is Mozart better than Haydn? Acoustic qualities-based analysis of stereoelectroencephalography. European Journal of Neurology, 28(5), 1463-1469. 2021.
Strehlow. The use of music therapy in treating sexually abused children? Nordic Journal of Music Therapy, 18(2), 167-183. 2009.

(56) References Cited

OTHER PUBLICATIONS

Sun, et al. Tension Experience Induced By Nested Structures In Music. Frontiers in Human Neuroscience, 14. 2020.
Supplemental Material for Universals and Variations in Musical Preferences: A Study of Preferential Reactions to Western Music in 53 Countries. Journal of Personality and Social Psychology. 2022.
Tal, et al. Neural entrainment to the beat: The "missing-pulse" phenomenon. Journal of Neuroscience, 37(26), 6331-6341. 2017.
Tang, et al. Effects of music therapy on depression: A meta-analysis of randomized controlled trials. Plos One, 15 (11) Nov. 2020.
Teixeira Borges, et al. Scaling behaviour in music and cortical dynamics interplay to mediate music listening pleasure. Scientific Reports, 9(1). 2019.
The Effects of Music Therapy by Self-Selected Music Listening on Terminal Cancer Patients' Affect and Stress by Pain Level—The Korean Journal of Hospice and Palliative Care | Korea Science. (n.d.). Retrieved Oct. 14, 2020. url: <https://www.koreascience.or.kr/article/JAKO2012174498884>.
The relationship between valence and chills in music: A corpus analysis | Rémi de Fleurian. (n.d.). Retrieved Nov. 24, 2020. url: <https://remidefleurian.com/publication/2020-psyarxiv-val/>.
Thoma, et al. Emotion regulation through listening to music in everyday situations. Cognition and Emotion, 26(3), 550-560. 2012.
Thoma, et al. Listening to music and physiological and psychological functioning: the mediating role of emotion regulation and stress reactivity. Psychology & Health, 27(2), 227-241. 2012.
Tirovolas, et al. Music Perception and Cognition Research from 1983 to 2010: A Categorical and Bibliometric Analysis of Empirical Articles in Music Perception. Music Perception, 29(1), 23-36. 2011.
Trainor, et al. Explaining the high voice superiority effect in polyphonic music: Evidence from cortical evoked potentials and peripheral auditory models. Hearing Research, 308, 60-70. 2014.
Trappe, et al. The Cardiovascular Effect of Musical Genres. Deutsches Arzteblatt International, 113(20), 347-352. 2016.
Trost, et al. Temporal dynamics of musical emotions examined through intersubject synchrony of brain activity. Social Cognitive and Affective Neuroscience, 10(12). 2014.
Tseng. Electrophysiological correlation underlying the effects of music preference on the prefrontal cortex using a brain-computer interface. Sensors, 21(6), 1-13. 2021.
Turnbull, et al. Semantic Annotation and Retrieval of Music and Sound Effects. IEEE Transactions On Audio, Speech, and Language Processing, 16(2), 467. 2008.
Tzanetakis, G., & Cook, P. (n.d.). Multifeature Audio Segmentation For Browsing And Annotation. Retrieved Feb. 4, 2021. url: <http://www.cs.princeton.edu/>.
Vempala, et al. Music of the 7Ts: Predicting and Decoding Multivoxel fMRI Responses with Acoustic, Schematic, and Categorical Music Features. Front. Psychol, 8, 1179. 2017.
Vines, et al. Analyzing Temporal Dynamics in Music: Differential Calculus, Physics, and Functional Data Analysis Techniques. Music Perception, 137-152. 2005.
Vogt, et al. Automatic Recognition of Emotions from Speech: A Review of the Literature and Recommendations for Practical Realisation. Lecture Notes in Computer Science (Including Subseries Lecture Notes in Artificial Intelligence and Lecture Notes in Bioinformatics), 4868 LNCS, 75-91. 2008.
Vuoskoski, et al. The pleasure evoked by sad music is mediated by feelings of being moved. Frontiers in Psychology, 8(Mar.) 2017.
Wallmark, et al. Neurophysiological Effects of Trait Empathy in Music Listening. Frontiers in Behavioral Neuroscience, 12, 66. 2018.
Garvija. On Musical Rewards: "Defrosting" musical chills with Naltrexone. 2019.
Gingras, et al. The Eye is Listening: Music-Induced Arousal and Individual Differences Predict Pupillary Responses. Frontiers in Human Neuroscience, 9. 2015.
Gold, et al. Predictability and uncertainty in the pleasure of music: a reward for learning ? J Neurosci, Oct. 2019.
Goldstein. Thrills in response to music and other stimuli. Physiological Psychology, 8(1), 126-129. 1980.
Gosling, et al. A very brief measure of the Big-Five personality domains. Journal of Research in Personality, 37(6), 504-528. 2003.
Greenberg, et al. Universals and variations in musical preferences: A study of preferential reactions to Western music in 53 countries. Journal of Personality and Social Psychology, 122(2), 286. 2022.
Grekow. From Content-based Music Emotion Recognition to Emotion Maps of Musical Pieces. http://www.springer.com/series/7092. 2018.
Grewe, et al. Chills in different sensory domains: Frisson elicited by acoustical, visual, tactile and gustatory stimuli. Psychology of Music, 39(2), 220-239. 2011.
Grewe, et al. How Does Music Arouse "Chills"? Investigating strong emotions, combining psychological, physiological, and psychoacoustical methods. Annals of the New York Academy of Sciences, 1060, 446-449. 2005.
Grewe, et al. Listening To Music As A Re-Creative Process: Physiologi- cal, Psychological, And Psychoacoustical Correlates Of Chills And Strong Emotions. Music Perception: An Interdisciplinary Journal, 24(3), 297-314. 2007.
Grewe, et al. Listening To Music As A Re-Creative Process: Physiological, Psychological, And Psychoacoustical Correlates Of Chills And Strong Emotions. DMRN+13: Digital Music Research Network. 2018.
Groarke, et al. Listening to self-chosen music regulates induced negative affect for both younger and older adults. PLoS One, 14(6). 2019.
Guhn, et al. Physiological and Musico-Acoustic Correlates of the Chill Response. Music Perception, 24(5), 473-483. 2007.
Hanke, et al. A high-resolution 7-Tesla fMRI dataset from complex natural stimulation with an audio movie. Scientific Data, 1, 1-18. 2014.
Harrison, et al. Thrills, chills, frissons, and skin orgasms: Toward an integrative model of transcendent psychophysiological experiences in music. Frontiers in Psychology, Jul. 5, 2014.
Harvey. Politics and Power in the Record Industry: The Beatles, the Beach Boys, and the Album as Art Form. Musicology Australia, 38(2), 153-171. 2016.
Hausmann, et al. Music-induced changes in functional cerebral asymmetries. Brain and Cognition, 104, 58-71. 2016.
Hoefle, et al. Identifying musical pieces from fMRI data using encoding and decoding models. Scientific Reports, 8(1), 1-13. 2018.
Holler, et al. Individual brain-frequency responses to self-selected music. International Journal of Psychophysiology, 86 (3), 206-213. 2012.
Huron, et al. On the Enjoyment of Sad Music: Pleasurable Compassion Theory and the Role of Trait Empathy. Frontiers in Psychology, 11, 1060. 2020.
Huron. Musical Aesthetics: Uncertainty and Surprise Enhance Our Enjoyment of Music. In Current Biology (vol. 29, Issue 23, pp. R1238-R1240). Cell Press. 2019.
Huron. Sweet Anticipation: Music and the Psychology of Expectation. MIT Press. 2006.
International Search Report and Written Opinion for PCT/US2022/033597, dated Sep. 23, 2022 (13 pages).
International Search Report and Written Opinion for Application No. PCT/US2024/018253, mailing date Jul. 31, 2024 (16 pages).
Jacoby, et al. Universal and Non-universal Features of Musical Pitch Perception Revealed by Singing. Current Biology, 29(19), 3229-3243.e12. 2019.
James. The physical basis of emotion. Psychological Review, 10(2), 205-210. 1893.
Janata, et al. Psychological and musical factors underlying engagement with unfamiliar music. Music Perception, 36 (2), 175-200. 2018.
Japanese Notice of Reasons for Refusal for Application No. 2023-577895 dated Dec. 10, 2025 (11 pages).
John, et al. The Big-Five Trait Taxonomy: History, Measurement, and Theoretical Perspectives. In L. A. Pervin & O. P. John (Eds.), Handbook of personality: Theory and research (vol. 8, Issue 2, pp. 102-138). Guilford Press. 1999.

(56) References Cited

OTHER PUBLICATIONS

Johnston, et al. 'Playlist for Life' at the end of life: a mixed-methods feasibility study of a personalised music listening intervention in the hospice setting. Pilot and Feasibility Studies, 8(1), 1-14. 2022.
Juslin, et al. Expression, Perception, and Induction of Musical Emotions: A Review and a Questionnaire Study of Everyday Listening. Journal of New Music Research, 33(3), 217-238. 2004.
Kaneshiro, et al. Natural music evokes correlated EEG responses reflecting temporal structure and beat. Neurolmage, 116559. 2020.
Karageorghis, et al. Music in the exercise domain: a review and synthesis (Part I). In International Review of Sport and Exercise Psychology (vol. 5, Issue 1, pp. 44-66). 2012.
Katahira, et al. Volitional Control of Piloerection: Objective Evidence and Its Potential Utility in Neuroscience Research. Frontiers in Neuroscience, 14. 2020.
Klepzig, et al. Brain imaging of chill reactions to pleasant and unpleasant sounds. Behavioural Brain Research, 380. 2020.
Koelsch, et al. Neocortical substrates of feelings evoked with music in the ACC, insula, and somatosensory cortex. Scientific Reports, 11(1), 1-12. 2021.
Koelsch. A coordinate-based meta-analysis of music-evoked emotions. Neurolmage, 223. 2020.
Koelsch. Investigating the Neural Encoding of Emotion with Music. Neuron, 98(6), 1075-1079. 2018.
Koneni, et al. Emotional and aesthetic antecedents and consequences of music-induced thrills. American Journal of Psychology, 120(4), 619-643. 2007.
Koulis, et al. From zero to sixty: Calibrating real-time responses. Psychometrika, 73(2), 321-339. 2008.
Kühn, et al. The neural correlates of subjective pleasantness. Neurolmage, 61(1), 289-294. 2012.
Lange, et al. Challenges and opportunities of predicting musical emotions with perceptual and automatized features. Music Perception, 36(2), 217-242. 2018.
Lartillot, et al. Data Analysis, Machine Learning and Applications. Jan. 2008.
Leeuwis, et al. A Sound Prediction: EEG-Based Neural Synchrony Predicts Online Music Streams. Frontiers in Psychology, Jul. 2021.
Lehne, et al. Tension-related activity in the orbitofrontal cortex and amygdala: An fMRI study with music. Social Cognitive and Affective Neuroscience, 9(10). 2013.
Levinson. Musical Chills. In Contemplating Art: Essays in Aesthetics. Oxford Scholarship Online. 2007.
Levitin, et al. Current Advances in the Cognitive Neuroscience of Music. Annals of the New York Academy of Sciences, 1156(1), 211-231. 2009.
Levitin, et al. Introduction to functional data analysis. Canadian Psychology, 48(3), 135-155. 2007.
Levitin, et al. Musical rhythm spectra from Bach to Joplin obey a 1/f power law. Proceedings of the National Academy of Sciences of the United States of America, 109(10), 3716-3720. 2012.
Lewin. Special Cases of the Interval Function between Pitch-Class Sets X and Y. Journal of Music Theory, 45(1), 1. 2001.

* cited by examiner

SYSTEMS AND METHODS FOR FILTERING LARGE AUDIO LIBRARIES USING PERCEPTIVE DISTRIBUTION BINNING

CROSS-REFERENCE TO RELATED APPLICATIONS

This application claims priority to and the benefit of U.S. Provisional Application Ser. No. 63/449,183, entitled "SYSTEMS AND METHODS FOR FILTERING LARGE AUDIO LIBRARIES USING PERCEPTIVE DISTRIBUTION BINNING," and filed Mar. 1, 2023 the contents of which is incorporated by reference herein in its entirety.

FIELD

The present disclosure relates to system and methods for filtering and sorting libraries of audio data and, particularly, to methods for quantitatively processing audio data to generate metrics for use in filtering and sorting methods based on distribution bins that are, for example, derived using human listening perception.

BACKGROUND

Filtering and exploring digital audio data within a large library (e.g., 100,000 songs) is traditionally done based on metadata with overt audio characteristics, such as artist, album, date, length, genre, or the like. More specific inquiries, such as searches or filtering based on acoustic and/or musical features is not a well-known ability for digital audio libraries, in part because such audio features are either not standardized, not available for all entries in the library, or not specific enough to be meaningfully used to downselect entries in large libraries. Moreover, traditional audio metadata is not reliable, too discrete, and not continuous. For example, for a typical list of songs in a 'Rock' genre (according to existing metadata conventions), that list cannot be sorted in any further way using the genre alone. That is to say, traditional metadata entries are mere classifications, without any specific objective definition such that sorting in continuous manner (e.g., more intense Rock songs are higher in the list and less intense Rock songs are at the bottom) is possible. This inability is not merely because no definition for Rock 'intensity' exist, but also because continuous information is not an information type traditionally provided for audio data libraries. This is, in part, because a lack of standardizations for musical features prevents such information from being provided by the publisher/artist, but also because the complex acoustic nature of music frustrates third party attempts at providing meaningful search and filtering options for existing libraries. Another reason is that most metadata is provided manually (e.g., per song or per album) and not a result of any additional audio processing. Moreover, even when additional processing is provided, it is typically limited to the very few simple and standardized metrics, such as dynamic range, amplitude, or beats per minute. While these example metrics provide additional information beyond the traditional metadata classifications, they often reflect the quality of the recording or mastering (e.g., amplitude and dynamic range depend more on the post-processing than the actual music) or provide information at such a high-level that they are practically useless for filtering or sorting music libraries (e.g., beats per minute is an easily-obtained metric, but tempos in music can be extremely variable and a single bpm value does not represent a perceptually-important way of assessing the underlying notes and rhythm within a given piece of music). In brief, using standard metadata or traditional audio processing does not provide for a perceptually-relevant level of filtering and sorting.

While relevant audio and musical features can currently be extracted via standard Music Information Retrieval (MIR) methods such that searching and filtering based on audio features can be achieved, it is also well-known that the myriad of different musical/acoustic features available are based on different measurement ranges and there is no consistency in how much each feature varies within its implicit, basic value ranges or how their distributions vary. Specifically of importance is the uncertainty of how a given metric's changing value (e.g., from song to song) varies with the actual real-world human-perceived variations. If existing techniques are used to directly surface these features to a user (e.g., via UI or API), they would struggle with inherent uncertainties over what different values meant and what types of music would be returned.

Accordingly, there is a need for filtering and sorting techniques that enable a consistent and predictable experience based on human perception of audio features and characteristics.

SUMMARY

Certain examples of the present disclosure provide for systems and methods of processing audio files and, specifically, large audio libraries, as well as filtering and sorting methods that enable a user (or computer system) to search and filter large digital audio libraries according to basic properties of music, and furthermore some not-so-basic, advanced properties of music (e.g., perceptually-important) which can be generated from the combination of two or more basic audio metrics into a composite metric. Some examples of perceptually-important audio features that can be derived from a digital audio file are Fast/Slow, Bass/Treble, Smooth/Rough, Quiet/Loud, Sparse/Dense, and Simple/Complex.

In some cases, there is a single underlying feature that can be used as a basis for the example features, and others. For example, Dissonance—a lack of harmony among musical notes—is an audio processing metric (e.g., with one or more established methods of calculation using digital audio data) that works well as a single feature. Dissonance, as a measurement result, returns continuous values that indicate a Smoothness vs. Roughness duality. That is to say, while the Dissonance result of one audio file may not indicate a specific degree of Smoothness/Roughness, any comparison of Dissonance results for two or more audio files enables a continuous sorting of those two or more files on a scale of Smoother to Rougher based on their calculated Dissonance. However, some features such as Fast/Slow have a variety of individually-important and objectively-calculable perceptual features which humans consider to represent the 'speed' of a song. In this case, examples of the present disclosure enable a combination of multiple underlying objective audio features into a single continuous value, which represents a continuum of perception for that feature.

In some cases, there can be problems with the underlying objective data for an individual acoustic feature for which the known extraction methods (e.g., calculations) are not always accurate. That is to say, due to the complexity and range of musical features, individual objective processing metrics are not sufficient to describe a particular perceptive feature with specificity across all musical ranges (e.g., genres). Accordingly, examples of the present disclosure include techniques for generating a distribution-based combination of multiple individual objective metrics to improve the specificity and stability of a final (composite) continuum for a particular acoustic feature. For example, beats-per-minute (BPM) can, in some cases, be interpreted by Music Information Retrieval BPM extraction techniques as a 'double-time' or 'half-time' interpretation of the BPM, whereas a human listener will hear that song as being twice as fast or twice as slow as the extracted BPM value. However, and according to examples of the present disclosure, combining the extracted BPM data with another perceptually-related objective audio metric, such as Spectral Flux (e.g., a measure of how quickly the spectrum of a song is changing over time), the resultant combination metric can effectively smooth out any discrepancies in the combined output and land on more reasonable and human perception aligned data.

Examples of this process can begin by extracting a variety of CB-MIR data streams (also referring to herein as objective audio processing metrics) from a musical recording. Examples of these are loudness, pitch, spectrum, spectral flux, spectrum centroid, mel frequency cepstral coefficient and others, which are discussed in more details herein. The specific implementation of feature extraction for any given type of feature can have parameterization options that affect the preparing and optimizing of the data for subsequent processing steps. For example, the general feature of loudness can be extracted according to several varieties of filters and methodologies.

Examples of the present disclosure include the use of objective audio processing metrics related to acoustic features found in the digital recordings of songs. This process does not rely on data from outside sources, e.g. lyrical content from a lyric database. The underlying objective audio processing metrics must be calculable and concrete in that there must be an 'effective method' for calculating the metric. For example, there are many known effective methods for extracting pitch melody information from recorded music saved as a .wav file or any file that can be converted to a .similar digital data formal.

Implementation of examples of the present disclosure can include the achievement of a number of different principal goals, such as: (1) Preservation of a continuous scale output in the resultant new composite metric (e.g., such that the songs can be ordered in a continuous range), (2) inclusion of every song from the original input set in the resulting dataset, (3) construction of a composite metric that exhibits a consistent, linear relationship to human perception, and is customizable to individual listeners and subgroups of listeners.

Several commercial applications for this technology can be employed based on the basic premise that curating large catalogs and making aesthetic judgments around musical recordings takes large amounts of time. Automating the ranking and searching of recordings for specific uses saves time. The amount of time it takes for humans to go through libraries of musical recordings to choose a recording for any use can be prohibitively large. It usually takes multiple listens of any recording to make an aesthetic assessment. Given that popular music has song lengths between 3-5 minutes, this assessment can take 6-10 minutes per song. There is also an aspect of burnout and decision fatigue: humans listening to many songs in a row can lose their objective judgment.

One use case example is for a large music catalog holder (e.g., an existing commercial service, such as Spotify, Amazon Music, Apple Music, or Tidal). A common goal of catalog holders is to get new paid users or to convert free users to paid users. Success can be at least partially based on the experience users have when interacting with the free version of the catalog holder's app or service (e.g., website). Accordingly, if a service has a means to provide a new way to filter and sort music to a user, by applying examples of the present disclosure, that may have a direct effect on their purchasing decision.

Another example implementation is in the entertainment and television industries. When directors choose music for their productions, they often must filter through hundreds of songs to find the right recordings and the right portions of the recordings to use. Examples of the present disclosure include applications, systems, and methods that enable users (e.g., directors) to narrowly focus on music within their chosen parameters and find the right recordings and phrases for a production.

One example of the present disclosure is a method of generating perceptually filterable music libraries. The method includes processing a plurality of digital audio files using a first objective audio processing metric to generate a first output for each of the plurality of digital audio files, the first output includes a value of the first objective audio processing metric and processing the plurality of digital audio files using a second objective audio processing metric to generate a second output for each of the plurality of digital audio files, the second output includes a value of the second objective audio processing metric. Then, generating first normalized outputs by rescaling a range of the first outputs of the plurality of digital audio files, generating second normalized outputs by rescaling a range of the second outputs of the plurality of digital audio files, calculating a first plurality of distribution bins of the first normalized outputs based on a distribution of the first normalized outputs in the plurality of digital audio files, calculating a second plurality of distribution bins of the second normalized outputs based on a distribution of the second normalized outputs in the plurality of digital audio files, generating a first intermediate value for each of the plurality of digital audio files by separating mapping, for each of the first plurality of distribution bins, values of the first normalized outputs to a new value based on a relative size of a respective distribution bin of the first plurality of distribution bins, generating a second intermediate value for each of the plurality of digital audio files by separating mapping, for each of the second plurality of distribution bins, values of the second normalized outputs to a new value based on a relative size of a respective distribution bin of the second plurality of distribution bins, generating a composite metric value for each of the plurality of digital audio files by combining the first and second intermediate values of the plurality of digital audio files; and calculating a plurality of distribution bins of the composite metric values for the plurality of digital audio files based on a distribution of the composite metric value in the plurality of digital audio files, where the first and second object audio processing algorithms are related to a same perceptual acoustic characteristic.

In some examples, the first and second normalized ranges have a same range. In some examples, the first plurality of distribution bins and the second plurality of distribution bins have the same number of bins. In some examples, the distribution bins of the composite metric have the same number of bins as the first and second plurality. In some examples, the first plurality of distribution bins and the second plurality of distribution bins each have 3 or more bins. In some examples, calculating the first plurality of distribution bins is further based on a pre-determined human perception of the first objective audio processing metric. In some examples, the calculating the first plurality of distribution bins includes determining a number of the bins of the first plurality of distribution bins and a range of each of the first plurality of distribution bins. In some examples, calculating a segmentation of the second plurality of distribution bins is further based on a pre-determined human perception of the second objective audio processing metric. In some examples, at least one of the first plurality of distribution bins or the second plurality of distribution bins are non-overlapping. In some examples, the distribution bins of the composite metric do not overlap. In some examples, at least one of the first plurality of distribution bins, the second plurality of distribution bins, or the distribution bins of the composite metric overlap such that values are found in at most 2 adjacent bins. In some examples, combining the first and second intermediate values of the plurality of digital audio files includes equally combining the first and second intermediate values. In some examples, combining the first and second intermediate values of the plurality of digital audio files includes unequally combining the first and second intermediate values. In some examples, the method further includes, before generating first normalized outputs, applying a practical range filter to a distribution of the first output, the practical range filter includes at least one of an upper limit or a lower limit on the value of the first objective audio processing metric, and where rescaling a range of the first outputs is done within the practical range filter such that values of the first objective audio processing metric above the upper limit are re-scaled at the upper limit and values of the first objective audio processing metric below the lower limit are rescaled at the lower limit.

Another method of the present disclosure is method of generating perceptually filterable music libraries that includes processing, using a processor, a plurality of digital audio files using a first objective audio processing metric to generate a first output for each of the plurality of digital audio files, the first output includes a value of the first objective audio processing metric, processing, using a processor, the plurality of digital audio files using a second objective audio processing metric to generate a second output for each of the plurality of digital audio files, the second output includes a value of the second objective audio processing metric, generating first normalized outputs by rescaling a range of the first outputs of the plurality of digital audio files, generating second normalized outputs by rescaling a range of the second outputs of the plurality of digital audio files such that the first and second normalized ranges have a same range, calculating a first plurality of distribution bins of the first normalized outputs based on a distribution of the first normalized outputs in the plurality of digital audio files and human perception of the first objective audio processing metric, calculating a second plurality of distribution bins of the second normalized outputs based on a distribution of the second normalized outputs in the plurality of digital audio files and human perception of the second objective audio processing metric, the second plurality having a same number of bins as the first plurality, generating a first intermediate value for each of the plurality of digital audio files by separating mapping, for each of the first plurality of distribution bins, values of the first normalized outputs to a new value based on a relative size of a respective distribution bin, generating a second intermediate value for each of the plurality of digital audio files by separating mapping, for each of the second plurality of distribution bins, values of the second normalized outputs to a new value based on a relative size of a respective distribution bin, generating a composite metric value for each of the plurality of digital audio files by combining the first and second intermediate values of the plurality of digital audio files; and calculating a plurality of distribution bins of the composite metric values for the plurality of digital audio files based on a distribution of the composite metric value in the plurality of digital audio files, where the first and second object audio processing algorithms are related to a same perceptual acoustic characteristic.

Yet another method of the present disclosure is a computer implemented method of operating a user interface on a display for interacting with a large digital audio library, the method includes causing a display to present a user interface to a user, the user interface including a plurality of selectable filtering dials, each filtering dial having an off state and an on state and a plurality of selectable positions, the selectable positions being active when the dial is in the on state and disabled when the dial is in the off state, an interactive list of at least a portion of the digital audio files present in the large digital audio library. Where the large digital audio library includes a database including a value for each of a plurality of different objective audio metrics for each digital audio files present in the large digital audio library, where each of the plurality of selectable filtering dials corresponds to a different composite objective audio metric, each composite objective audio metric representing a perceptually distinct audio quality calculated based on combined distributions of the values of two or more of the objective audio metrics in the large digital audio library, where each of the plurality of selective positions corresponds to a distinct distribution bin of values of the composite objective audio metric, and where each of the plurality of selectable filtering dials are configured such that when the each filtering dial is set to the on state, the interactive list is filtered to only include digital audio files having values of the corresponding composite metrics present in the distinct distribution bin corresponding to the selective position of the filtering dial.

BRIEF DESCRIPTION OF DRAWINGS

This disclosure will be more fully understood from the following detailed description taken in conjunction with the accompanying drawings, in which.

DETAILED DESCRIPTION

Certain exemplary embodiments will now be described to provide an overall understanding of the principles of the structure, function, manufacture, and use of the devices, systems, and methods disclosed herein. One or more examples of these embodiments are illustrated in the accompanying drawings. Those skilled in the art will understand that the devices, systems, components related to or otherwise part of such devices, systems, and methods specifically described herein and illustrated in the accompanying drawings are non-limiting embodiments and that the scope of the present disclosure is defined solely by the claims. The features illustrated or described in connection with one embodiment may be combined with the features of other embodiments. Such modifications and variations are intended to be included within the scope of the present disclosure. Some of the embodiments provided for herein may be schematic drawings, including possibly some that are not labeled as such but will be understood by a person skilled in the art to be schematic in nature. They may not be to scale or may be somewhat crude renderings of the disclosed components. A person skilled in the art will understand how to implement these teachings and incorporate them into working systems, methods, and components related to each of the same, provided for herein.

To the extent the present disclosure includes various terms for components and/or processes of the disclosed devices, systems, methods, and the like, one skilled in the art, in view of the claims, present disclosure, and knowledge of the skilled person, will understand such terms are merely examples of such components and/or processes, and other components, designs, processes, and/or actions are possible.

A number of representative processing examples are presented herein. In a first example, a sufficiently large and diverse library of digital music files is available to process. In a first step, a large variety of objective audio processing metrics are used to evaluate each file, each objective audio processing metric returning at least a quantitative result for each file, enabling a subsequent understanding and leveraging of the scale, distributions, and maximum and minimum values for each metric. It is advantageous if this library is representative of what type of music will be analyzed in the event that this system is applied to another library of music. Example implementation can be used as an absolute scale that represents all types of music. Thus, at the end of this first step, a database of values is created, at least one result value for each objective audio processing metric per song. That is, if there are 100,000 songs and 10 metrics, a resultant database could contain 100,000×10 entries.

Figure 1:
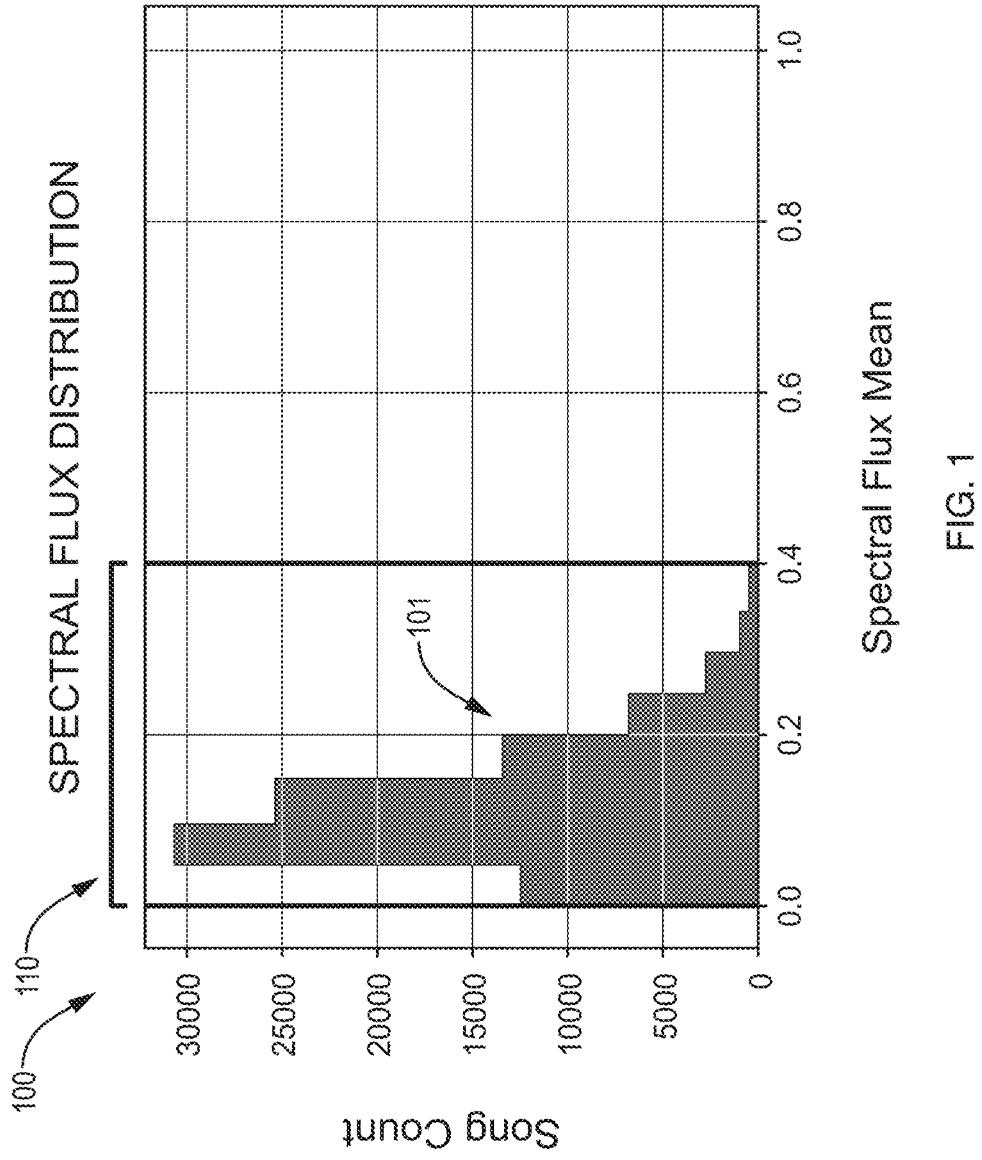
FIG. 1 is a distribution plot of a first objective audio metric for a representative large and diverse library of digital music.

In an illustrative second step, and for each metric of interest (e.g., all of, or a subset of, the objective audio processing metrics calculated in the first step), a distribution graph is created to identify where to begin looking for the perception bins that represent the lowest and highest categories of reasonable human distinction between stimuli. Ultimately, in some examples of use cases, characteristics of the distribution, such as shape, mode, skew, etc. are ignored. Representative examples may be concerned with establishing where the limits (e.g., tails) of the distribution begin and end so that a practical range of realistic values for a given metric can be determined. For example, a metric might technically have an output range of 0 to 1, but in terms of real world data (e.g., music) the practical range of output values might be 0.1 to 0.4. FIG. 1 is a spectral flux distribution graph 100 that shows the output distribution 101 of Spectral Flux (e.g., an objective audio processing metric) for an example library of approximately 100,000 music files with a diverse genre distribution. FIG. 1 shows that, within any statistical significance, the distribution of values for the Spectral Flux metric for his example library ranges from 0.0 to 0.4 for the entire library. Thus, 0.0 to 0.4 can be used to cap the practical range 110 and establish a subsequent re-scaling, as shown in FIG. 2.

In an illustrative third step, once the practical range for a given metric is established, a scaling process is be applied to standardize the output across all metrics. For example, FIG. 2 is a rescaled spectral flux distribution graph 200 of shows the Spectral Flux metric of FIG. 1 re-scaled 201 to have a scale between 0 and 1 according to determined practical range 101. As part of that scaling process, any values that happen to fall outside the established practical range 101 for a metric can be capped to a floor or ceiling value of the practical range before being rescaled to the standard range, shown n FIG. 2. For example, any music files with a Spectral flux of 0.41 or higher can be set to 0.4, which becomes 1.0 in FIG. 2. This is shown as a small peak 202 in the data 201 of FIG. 2 at the re-scaled value of 1.0, thus representing the entire range above 0.4.

Accordingly, any and all audio metrics of interest can likewise be calculated and then scaled to the same 0 to 1 range. FIG. 3 shows a graph 300 for the output distribution 301 of a Beats per Minute (BPM) objective audio processing metric for the same library as FIG. 1, with a capped practical upper and lower distribution range 310 shown of 60 and 190. Next, as with Spectral Flux in FIG. 2, FIG. 4 is a graph 400 of the BPM distribution data (301 of FIG. 3) re-scaled to a 0.0 to 1.0 range (shown in FIG. 4 as new distribution data 401).

Figure 2:
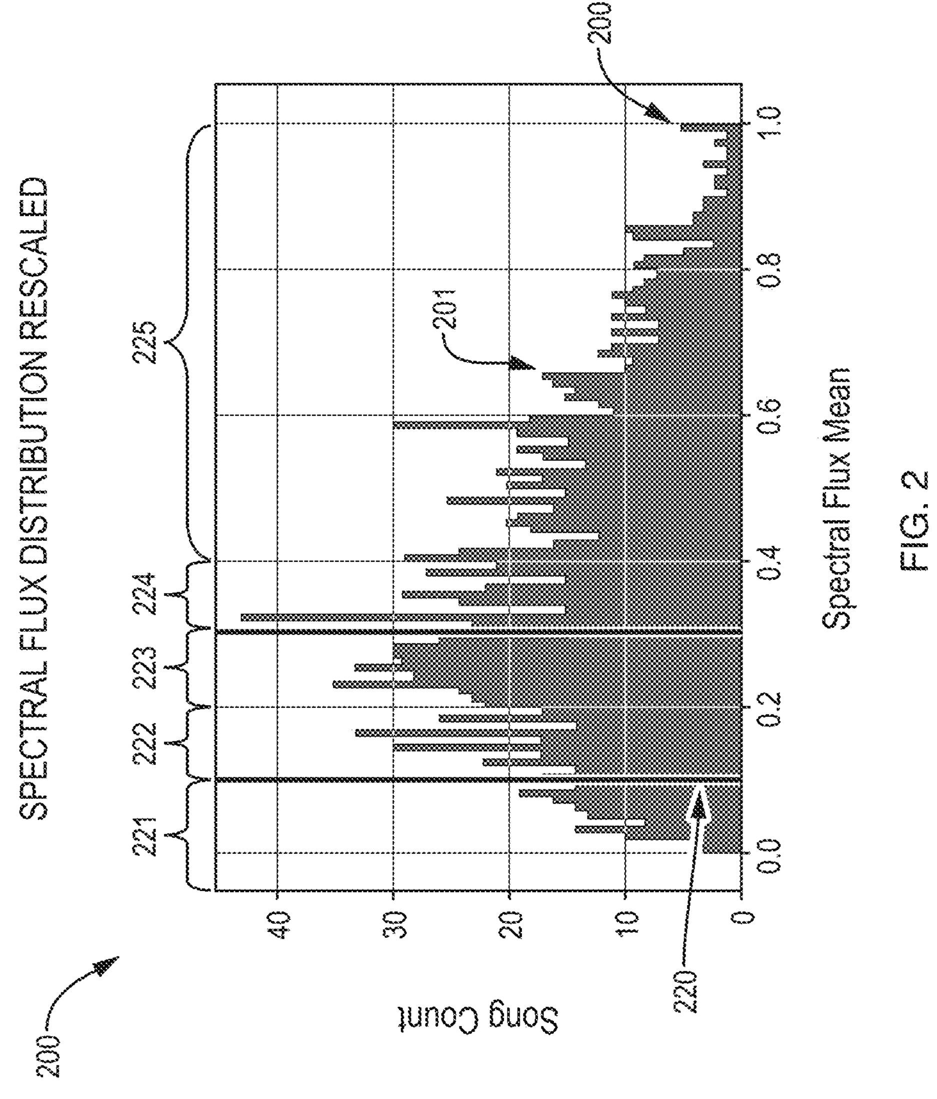
FIG. 2 is a re-scaled distribution plot of the first objective audio metric of FIG. 1 with five perceptual bins illustrated.
Figure 3:
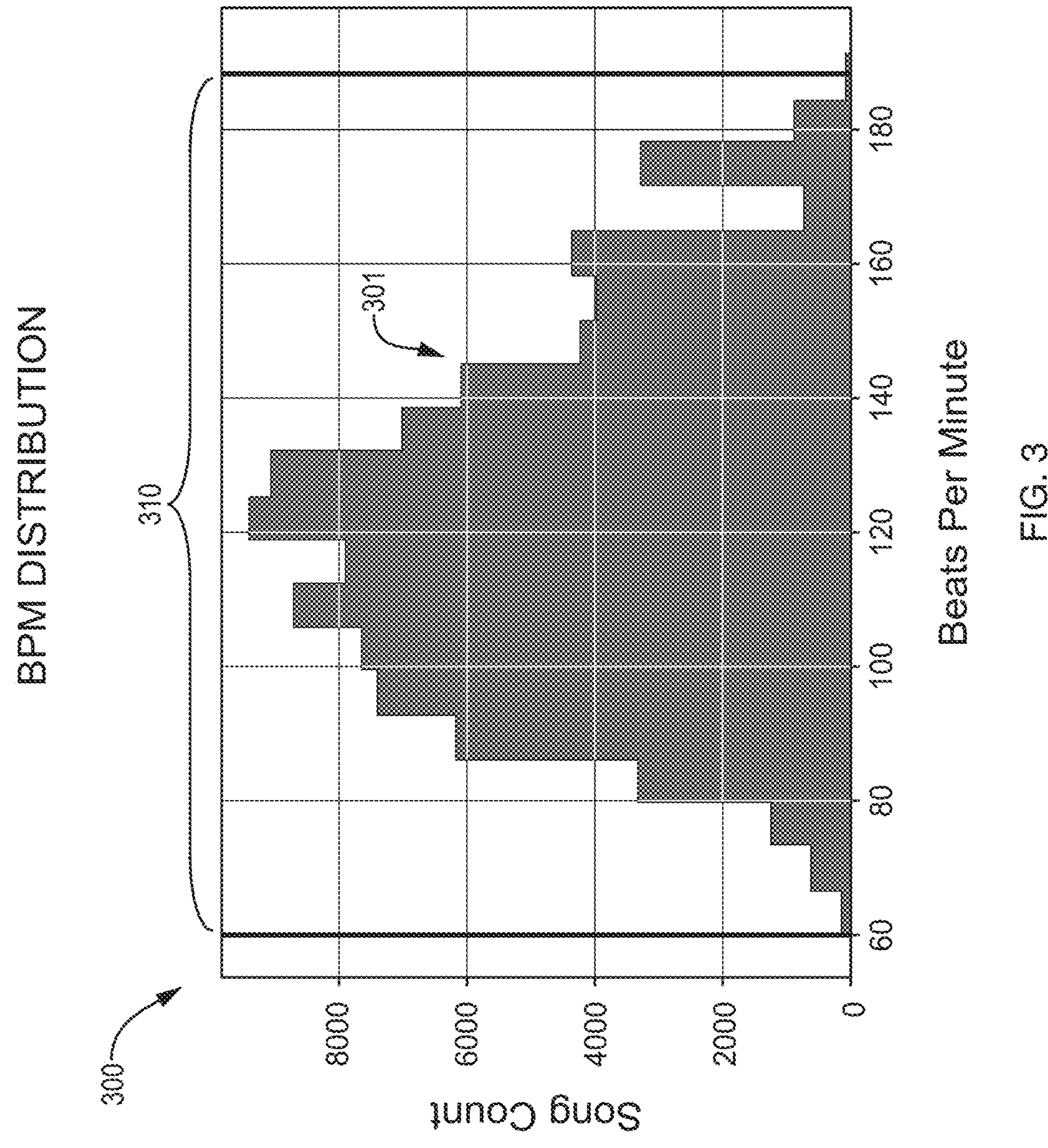
FIG. 3 is a distribution plot of a second objective audio metric for a representative large and diverse library of digital music.
Figure 4:
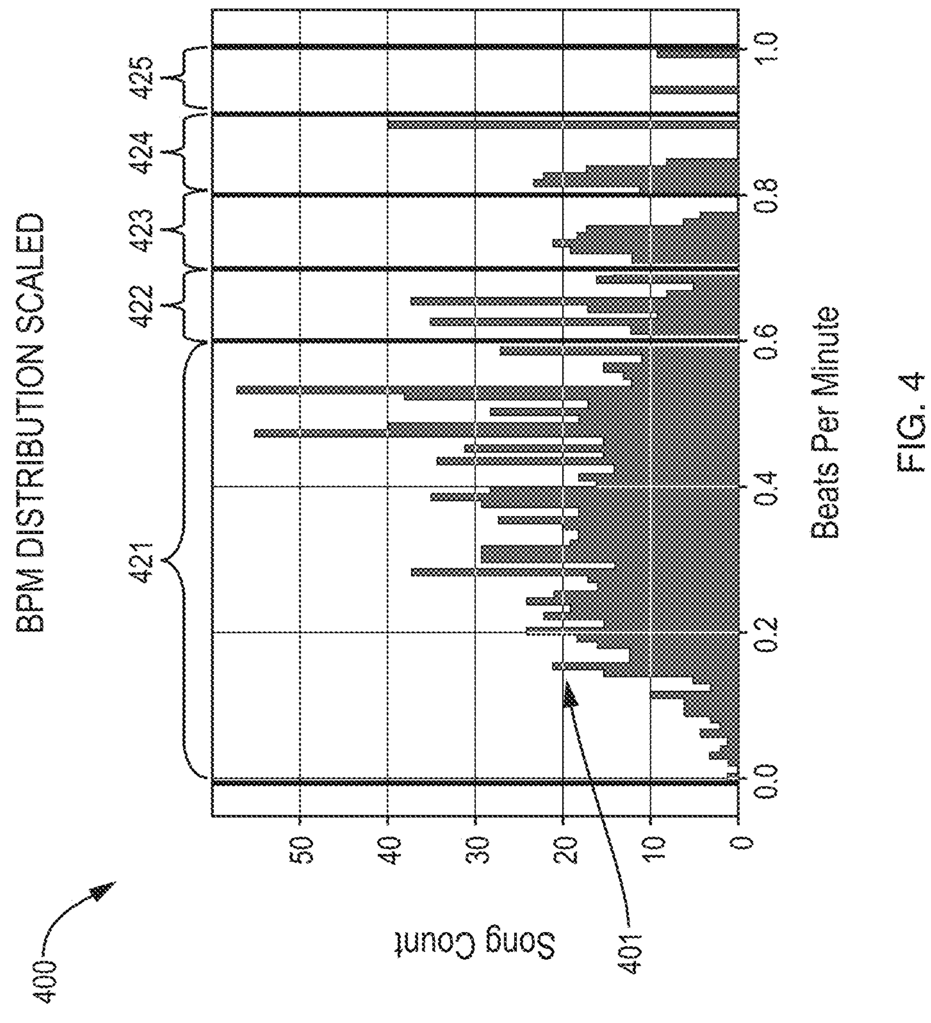
FIG. 4 is a re-scaled distribution plot of the second objective audio metric of FIG. 3 with five perceptual bins illustrated.

In an illustrative fourth step, and after establishing the practical range, capping outlier values, and re-scaling to a standard (e.g., 0 to 1), a process of establishing a predetermined number of bins for the re-scaled distribution of each metric can be conducted (e.g., 5 bins, as shown in FIGS. 2 and 4). In FIG. 2, five bins 221, 222, 223, 224, 225 are illustrated by thicker vertical lines 220 showing their demarcation in the distribution 201 and in FIG. 4, five bins 421, 422, 423, 424, 425 are illustrated by thicker vertical lines 420 showing their demarcation in the distribution 401. Here, the five bins 221-225, 421-425 do not overlap, but overlap is possible in some examples. The binning process can be based specifically and, in some examples, exclusively on human perception such that, ideally, each the specific characteristics of the audio data contained in bin has a real-world perceptible difference to a human car when compared to the neighboring bins, such that the audio at the center of each bin is clearly different in terms of human perception, and furthermore that ranges of each bin are defined such that the human-perceptible differences are maximized between bins.

Accordingly, the bins for a given metric and distribution can be unique (e.g., as shown by the different ranges for the perception bins of FIGS. 2 and 4), and can depend on a number a factors. The process of determining where the bins should be defined can vary in its rigorousness. In some cases, the judgements of content experts can be employed to arrive at meaningful results (e.g., music experts listening to sample music stimuli representing the full range of all possible bpm values can define bins that group music naturally according to their experience and established knowledge of the subject). A more rigorous process can be employed which utilizes methods established within professional domains such as psychoacoustics to evaluate where bins for a given metric should be defined. These methods can entail full-fledged behavioral studies that use potentially hundreds of test subjects to generate data that can be used to construct formalized analyses such as ROC curves and psychometric functions for a given metric. The results of formalized evaluation by test subjects can then effectively generate groupings within a metric's distribution that represent perceptually-clear differentiations to a listener such that, for example, the perceptual differential between two songs in the same bin is more difficult to perceive than between two songs belong to different bins.

The resulting perception bins can vary in width along the 0 to 1 standardized range. This is a phenomenon that is a result of the fact that any given metric is not likely to exhibit a perfectly linear output in synchronization with human perception. An example of the unequal perception bin sizes might be a metric that has the following 5 bins: [0.0-0.1, 0.1-0.2, 0.2-0.3, 0.3-0.4, and 0.4-1.0]. In this example, the first four perception bins represent 10% of the metric's practical range, while the fifth bin is 60% of the practical range. Another metric might have the opposite distribution, where the first bin is 60% of its practical range, and the second through fifth bins are 10% each.

While it may be that perceptual differences are minimized at the boundary between bins, examples include overlapping bins such that a subgroup of songs at a bin-border can be populated into both bins, and examples include bins established such that a mean or medium within each bin is the proper point of perceptual comparison. Notably, this can depend on the number of bins established, and while five bins are used in the examples herein, as few as two or three are possible, and the maximum number is not limited. However, in practice, increasing the number of bins reduces the strength of the perceptual differences between adjacent bins and, at some point, this approaches the intra-bin differences, which can represent an effective upper bound on the number of bins. Given human perception, and the subsequent implementations of these bins in filtering and sorting, it is anticipated that having 4 or 5 bins may more useful than having only 2 or 3 and, similarly, more useful than having ten or more. Generally, the number of bins can be based on the type of acoustic characteristic being calculated (e.g., differences in some features are more easily perceived by human listeners) as well as the type of music in the library (e.g., libraries having less acoustic diversity of a certain characteristic may benefit having fewer bins for an objective measure of that characteristic as compared with a library having more diversity, as overall perceptive distribution depends on the library's inherent distribution, which may be visible in the shape of the scaled distribution). Accordingly, examples of the present disclosure include setting the number of bins as a function of, for example, the shape or other statistical characteristics of the distribution.

In an illustrative fifth step, a piecewise function can be applied that maps metric values contained within any given perception bin to a new value that accounts for the relative size of the perception compared to the implied standardized size of bins if they were scaled uniformly across the 0 to 1 range. This part of the process that can provide the base metrics and, by extension, any subsequently generated combined composite metrics, a predictability and consistency when exposed to users via UI or API. For example, in the case where the fifth perception bin of a metric is 60% of the 0 to 1 range, if a scalar value returned for the given metric for a given song was 0.5, its re-mapped value would become 0.8333, according to the following equation:

$$\text{New Value} = (\text{old\_value} - \text{in\_min}) * (\text{out\_max} - \text{out\_min}) / (\text{in\_max} - \text{in\_min}) + \text{out\_min};$$

$$\text{New Value} = (0.5 - 0.4) * (1 - 0.8) / (1 - 0.4) + 0.8;$$

$$\text{New Value} = (0.1) * (0.2) / (0.6) + 0.8;$$

$$\text{New Value} = 0.83333$$

Figure 5:
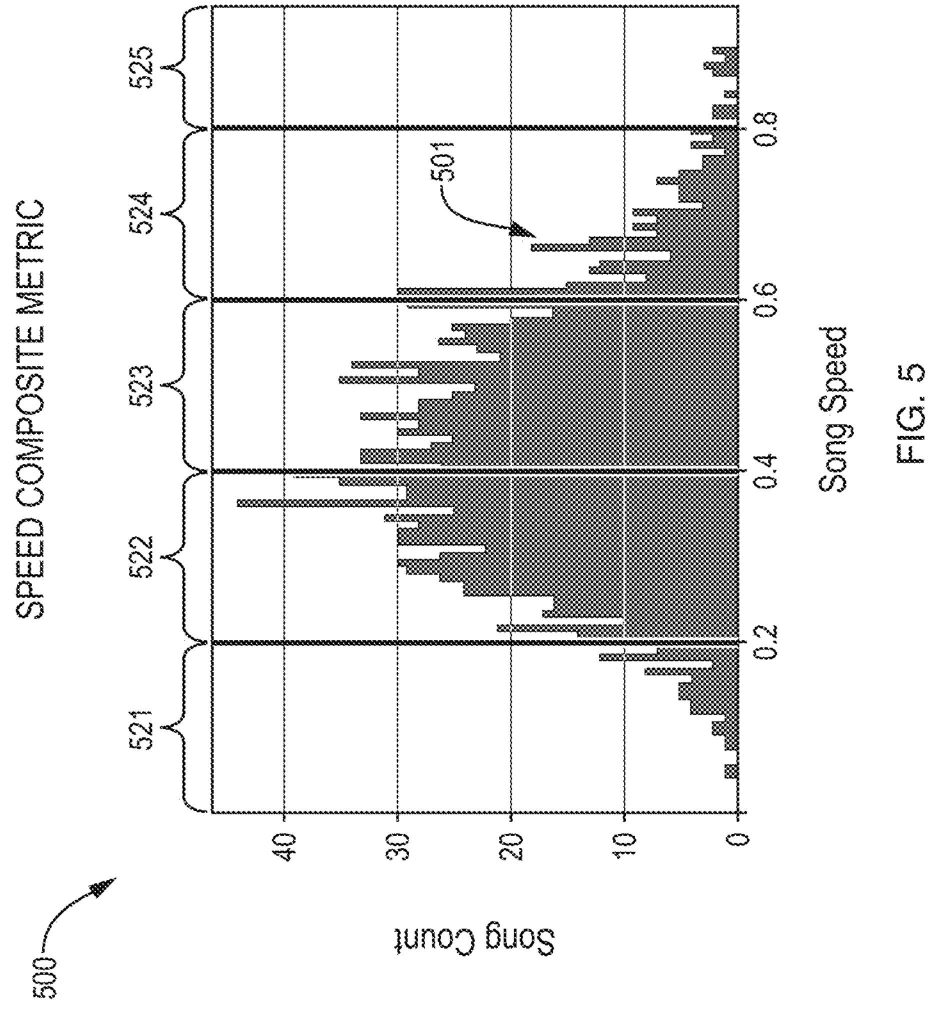
FIG. 5 is a distribution plot of a combination metric example of the present disclosure using the re-scaled first and second objective audio metrics of FIG. 2 and FIG. 4.

This process gives an implied weighting to the original metric value based on its placement within the perception bin (shown visually in FIG. 6, and discussed in more detail below). A mapping function can be applied to the underlying metric outputs for each entry (e.g., song) where two (or more) metrics are desired to be combined into a composite metric. An example composite metric, named 'Speed' is shown in FIG. 5, and represents the relative perceptual 'slowness' or 'fastness' of a song generated as a combination of the re-scaled Spectral Flux distribution for FIG. 2 and BPM distribution of FIG. 4. FIG. 5 shows a distribution graph 500 of the output 501 of the speed composite metric. In operation, two or more re-scaled metric values (e.g., values of distributions 201 and 401) are combined into one value (e.g., values of distribution 501) by one of a number of possible combination methods (e.g., adding, multiplying, or averaging) to arrive at a final value for the new, engineered composite metric. In the illustrative example of FIG. 5, the values of the re-scaled Spectral Flux and re-scaled BPM were added and then averaged by dividing by two in order to keep the new composite value in a 0 to 1 scale.

Once the base metrics have been combined as described above, a final step to confirm where the bin edges should be placed can be performed. As show in FIG. 5, the speed composite metric distribution is segmented into five evenly spaced bins 521, 522, 523, 524, 525. In some examples, the perception bins of the composite metric follow the demarcations set forth by the binning that occurred in the previous step such that each bin of the composite metric is equal in scaled range, but other examples are possible, such as when objective metrics with differing numbers of distributions bins are combined into a composite metric.

Figure 6:
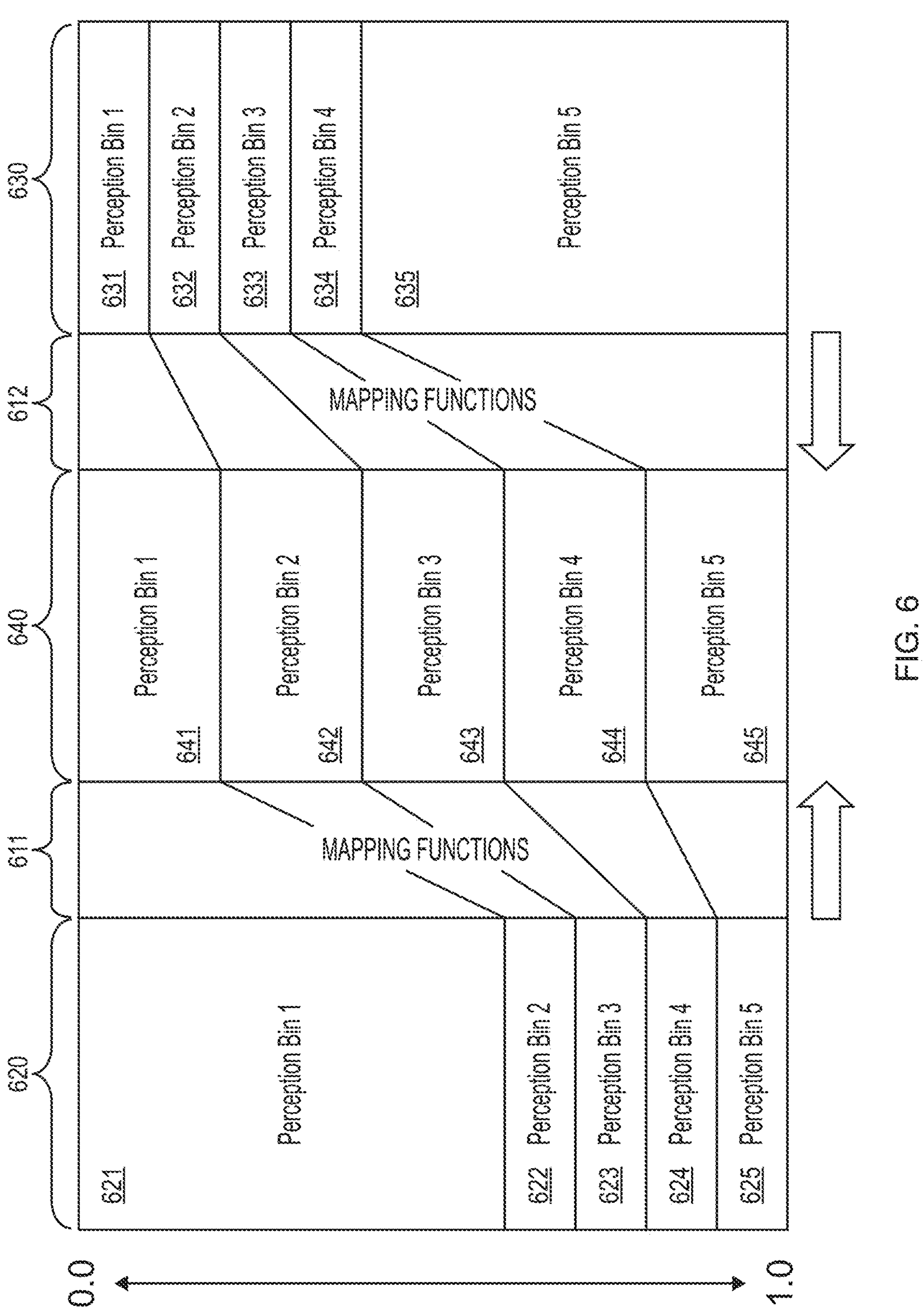
FIG. 6 is a visual representation of the combination process used to generate the combination metric of FIG. 5.

FIG. 6 shows a graphic illustration 600 of a generic composite metric generation process. The process 600 illustrates the creation of a composite metric 640 includes a distribution of values in 5 bins 641-645 using two rescaled objective audio metric distributions 620, 630 as inputs and each having a respective set of 5 distribution bins 621-625, 631-635. In this example, the distributions of the rescaled objective audio metric distributions 620, 630 are shown to be from 0.0 to 1.0, which is also the value distribution of the resultant composite metric 640. In this example, the distribution bins 621-625, 631-635 of the rescaled objective audio metric distributions 620, 630 are unequally distributed (both with respect to each other and internally). However, the resultant distribution of the bins 641-645 of the composite metric 640 are equally distributed. This change, while not require, reflects the processing of the mapping functions 611, 612 that are used to combine the rescaled objective audio metric distributions 620, 630. Basically, given that both rescaled objective audio metric distributions 620, 630 contain 5 perceptive distribution bins, the most simple combination is to combine them 1:1, with the ultimate 'equal' distribution of those 5 composite bins being effectively a function of having the same mapping function 611, 612 used for each. While in some example the mapping functions unequally combine the bins of each rescaled objective audio metric distributions 620, 630 (e.g., weighting one more than the other), the mapping functions 611, 612 can still be scaled to result in the 5 composite bins having equal segmentation ranges from 0.0 to 1.0. Instead, what can be important is the distribution of the values in those 5 composite bins, which can be the same even if the ranges of the 5 composite bins change. Accordingly, what effects the distribution of the values in the 5 composite bins is the specific mapping functions 611, 612.

One example mapping function is a simple average whereby each value from each perceptive distribution bin 621-625 of the first rescaled objective audio metric distributions 620 is added each a respective one value from each perceptive distribution bin 631-635 of the second rescaled objective audio metric distributions 630 and then divided by two. This is an example of equal weighting, however examples include unequal weighting, such as 2:1, which twice the first values being added with the second values and divided by 3 or even multiplicative mappings where values are multiplied together. Any number of different mapping functions are possible and can depend on, for example, the relationship between the composite metric being generated and the determined (e.g., perceptual) contribution from the metrics being combined. While FIG. 6 shows two metrics combined, examples include combining 3 or more metrics with no upper limit. Examples also include creating composite hierarchies, such that composite metrics can be created using inputs of one or more already created composite metrics.

EXAMPLE COMBINATION METRIC PROCESSING

A number of examples are presented below of different types of combination metrics that can be generated to capture large-scale and perceptually-distinct acoustic features. A brief motivational description is provided along with examples of individual metrics that can be combined to establish the combination metric.

Example 1: Simple/Complex (e.g., Complexity Continuum)

Songs can be simple or complex in different ways. A non-comprehensive list of examples of types of complexities is as follows: songs can have few notes (e.g., just a single note repeating) in the melody or many different notes, which can affect the perception of melodic complexity. In addition, songs can have simple or complex structures in terms of the repetition of phrases and choruses of a song and songs can have simple to complex chord progressions. A composite metric generated from underlying metrics can generate a user-friendly dial (e.g., an interactive filtering setting that allows selection of bins of a composite metric) that is consistent and follows human intuition. Non-limiting examples of individual metrics that can be perceptually-relevant to generating a complexity metric are Chord Change Rate (e.g., a measurement of the rate at which chords are changing within a song) and Chord Shannon Entropy (e.g., a measurement of the variety of chords contained within a song).

Example 2: Fast/Slow—(e.g., Speed Continuum)

A user perceiving a song as fast or slow is more complex than measuring a traditional musical tempo. An example of this would be a song, such as Showdown by Thin Lizzy, whose extracted BPM is 162 but human listeners typically perceive the tempo of this song as 81 because of the specific musical presentation, which is not accounted for in a simple 'beats per minute' calculation. If BPM alone is used as a metric for Fast/Slow, there is no way of interpreting this example song as anything but 'fast,' relatively to, at least, the example 100,000 song library used for examples presented herein (e.g., in the $4^{th}$ of the 5 bins of FIG. 4). However, calculating the Spectral Flux Original Mean of Showdown returns 0.05, which is on the low end of the Spectral Flux continuum when looking at distribution values for the representative library (e.g., in the $1^{st}$ of the 5 bins of FIG. 2). By combining, according to the composite metric examples disclosed herein, a 'fast' objective distribution interpretation of the BPM value for this example song with the 'slow' objective distribution interpretation of the Spectral Flux value, the result is 0.425. Below are the steps taken to arrive at that value:

BPM Raw Value=162

BPM Capped/Rescaled Value=0.85

Spectral Flux Raw Value=0.05

Spectral Flux Capped/Rescaled Value=0.075

Mapping Function Applied to Both Values

For the BPM metric:

$$\text{New Value} = (\text{old\_value} - \text{in\_min}) * (\text{out\_max} - \text{out\_min}) / (\text{in\_max} - \text{in\_min}) + \text{out\_min};$$

$$\text{New Value} = (0.85 - 0.8) * (0.8 - 0.6) / (0.9 - 0.8) + 0.6 = 0.7;$$

For the Spectral Flux metric:

$$\text{New Value} = (\text{old\_value} - \text{in\_min}) * (\text{out\_max} - \text{out\_min}) / (\text{in\_max} - \text{in\_min}) + \text{out\_min};$$

$$\text{New Value} = (0.075 - 0) * (0.2 - 0) / (0.1 - 0) + 0 = 0.15;$$

Then the average of the two new values is calculated to arrive at the final result value of 0.425.

Accordingly, 0.425 is an 'average' value for the combination Fast/Slow metric shown in FIG. 5, with this example song being placed in the $3^{rd}$ of the 5 bins. The combination of underlying features representing more complex human perceptual meanings provides stability to the result of the final distribution and places songs, which would normally be placed in the wrong category using a single feature into the correct category when combining features. Accordingly, the predictive quality of a combination metric of a large-scale acoustic feature can be improved when two or more different, but perceptually-related, metrics are combined. Moreover, examples can include weighting different metrics unequally in the combination. For example, if two metrics are used to extract tempo information and they are combined with a third metric that related to the change in dynamics (e.g., Spectral Flux), the tempo metrics could be weighted at 25% each, with Spectral Flux weighted at 50%. These weightings can be set or adjusted based on a number of relevant objective or subjective parameters. For example, the objective nature of the library (e.g., for libraries where the included genres have little variation in tempo, the Spectral Flux could be weighted higher) or subjective listener studies (e.g., where listeners are asked to self-assign a slow/fast value to a given song, which can, in aggregate, be used to determine a contribution assessment for the relevant individual metrics).

Example Implementations

A number of different use-cases for the combination metrics are presented. An example generic use case is any instance where there is a large amount of information and one wants to select a subset of that information using two or more features which individually exhibit characteristics representing a continuous (but nonlinear) spectrum between two bi-polar properties. These properties can represent complex dualities derived from a multiplicity of underlying features.

Automating the Creation of Streaming Consumer Music Playlists

It may be desirable for users of a streaming music service to generate playlists that exhibit certain characteristics (e.g., slow and smooth music) that are not necessarily completely or explicitly implied by sorting by existing classifications such as genre, or even artist name. It may further be desirable to generate a playlist that takes into account a multiple of characteristics such that the playlist mix actively avoids repetition of audio characteristics. For example, examples of the present disclosure can be used to create a playlist with a sequence such that the intensity (e.g., loudness and dissonance) of the songs on the playlist proceeds smoothly from low to high and back again.

Health Care and Music Therapy

The ability to automate selection of music for specific health care applications known to create specific outcomes in patients can increase the benefits for patients and allow for more personalized music that match specific treatment options. For example, patients who undergo surgical operations can listen to relaxing music after their procedure to experience pain reduction with the use of less opioids. Generalized anxiety disorders can also be treated with relaxing music. Furthermore, research supports that the outcomes of such treatments are increased when the patient listens to music that they prefer. Examples of the present disclosure enable the cross selection of artists or genres which the patient is familiar with music which also matches the therapeutic features of relaxing music necessary for the treatment. The finely tuned gradation of composite features can also be used to customize the results for individual patients.

Displaying the Distribution of Songs in a Library Real-Time as Selections are Made It may be useful to enable a user browsing the contents of a large library of music to be presented with a visual representation of the distribution of songs that exhibit specific characteristics. For example, a library that has had the loudness of songs separated into five perceptual bins can display the number of songs within each bin. Furthermore, once a perceptual bin of a given type is selected, the visual distributions of songs remaining in the perceptual bins of other types could be updated in real-time and presented accordingly. This allows a user the means to explore a large library by stepping through a path of exploration that gives the user a sense of how common or how limiting (e.g., rare) the songs are that consist of the combination of filters being applied or about to be applied.

Discovering New Music

Examples of the present disclosure enable a user of large music catalogue or steaming service to observe the music characteristics of one or more song and generate a new playlist of music entries that have the same or similar characteristics. It is a common feature for streaming services to provide a 'radio' option after a song is played that plays a continuous list of similar music. However, how 'similarity' is defined can vary and may be, simply, songs regularly played together by other users. Examples of the present disclosure include new ways for music to be discovered and associated by, for example, generating new playlist of acoustically-similar music in a given genre by artist, date or date range, or in any traditional music classification.

Sub-Libraries

Examples of the present disclosure enable the distributions of acoustic features from large libraries to be re-used to explore sub-libraries. For example, in the 100,000-song list example used herein, a sub-library can be created. For example, songs released in the 1980s—perhaps 20,000 of the 100,000. In this sub-library, the distributions for the entire library can be used, but new distributions can also be generated using the existing data and new filtering and sorting options can be provided for the sub-library with their scaling done only according to music entries present in the sub-library. For example, 'Fast/Slow, overall' and 'Fast/Slow, for the 1980s.' This can be particularly useful for genres that have common acoustic characteristics. Electronic dance music (EDM), for example, is typically a 'faster' style, and thus a sub-library of only this genre may find all the entries in a single bin of a 'Fast/Slow, overall' filtering, thus rendering that filter effectively useless. Accordingly, a 'Fast/Slow, genre' would generate bins—perhaps fewer than would be present in the overall option, as the characteristics (e.g., shape) of the distribution may be substantially different—that reflect the perceptual distribution of the Fast/Slow combination metric across the selected genre.

Databases

Examples of the present disclosure include the creation of databases for the results of the objective audio metrics and subsequent distributions and binning that can be maintained separately from a repository of digital music files used to create the database. Because the result of the distribution and binning process can be, effectively, a relationship between a plurality of individual metric and combination metric results for a given song and a bin-location for each result, this relationship can be maintained separate from the source audio data and improved or adjusted within re-processing any music files. Improvements and adjustments can be done when, for example, a sufficient number of new music files are added to the library such that the distributions may have drifted. Each 'dial,' which herein refers to a combination metric distribution for a library and the associated bins can be maintained as a separate database and new dials can be added and changed independently of the others. Additionally, to facilitate filtering and sorting of very large music catalogues, individual databases can be maintained for each dial, with individual bins organized in a same manner to enable fast downselection of data when multiple dials are set.

User Interfaces

Examples of the present disclosure include music delivery and streaming media platforms and applications configured to use the example system and methods described herein to allow users to sort and/or filter large music libraries.

Figure 7:
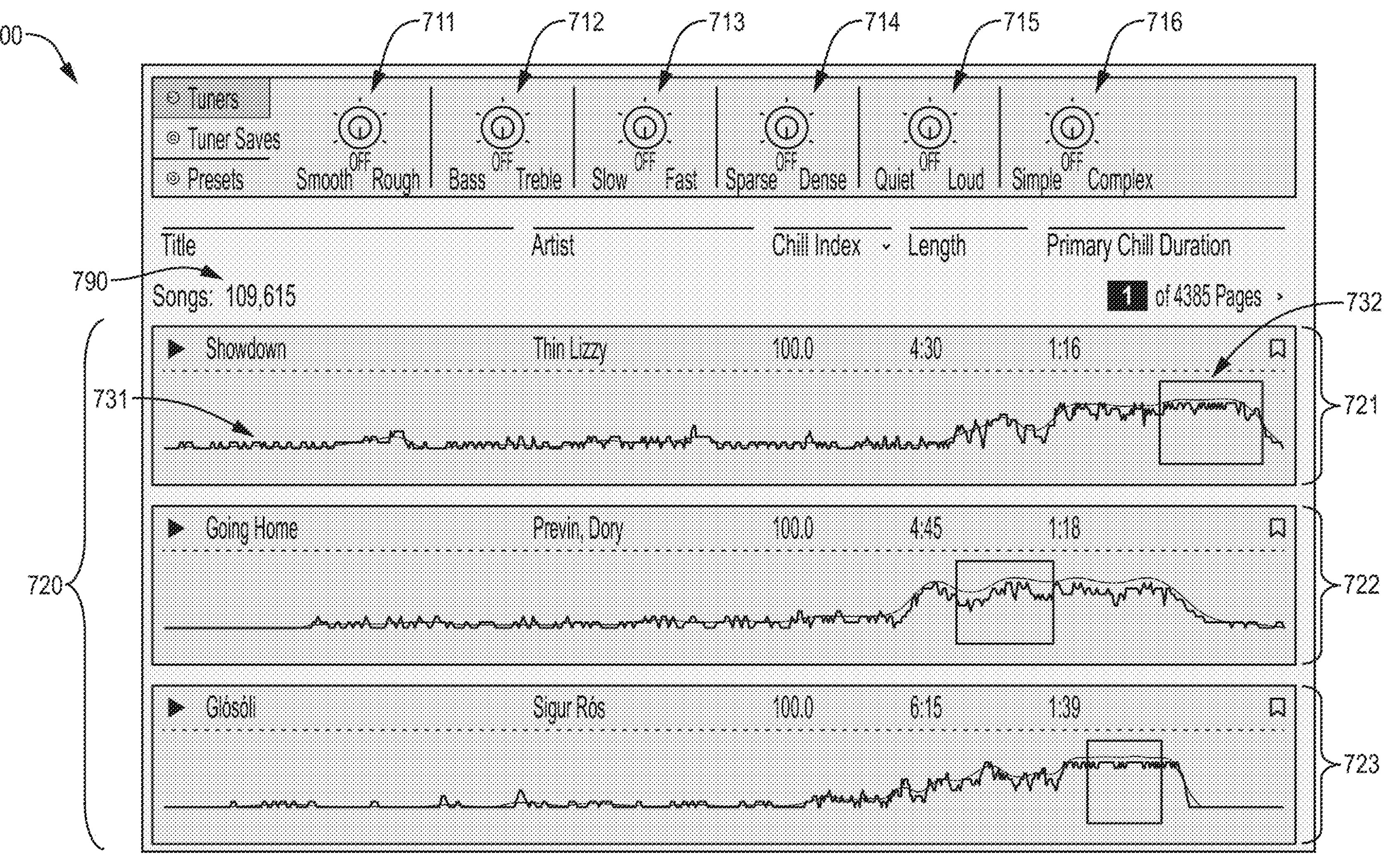
FIG. 7 is a graphical user interface example showing an unfiltered view of the start of a list of 109,615 digital music files in a digital library.

FIGS. 7-10 show a music catalogue user interface 700 that includes six filtering dials 711-716 according to aspects of the present disclosure. FIG. 7 shows an unfiltered list 790 of the library includes 109,615 songs, which are digital music files of a diverse mix of all types of music. The entire 109,615 song have been processed to produce a number of objective audio metrics for each song, and six combination metrics and their distributions have been calculated according to aspects of the present disclosure. The six combination metrics correspond to the six tuning dials shown: Smooth/Rough 711, Bass/Treble 712, Slow/Fast 713, Sparse/Dense 714, Quiet/Loud 715, and Simple/Complex 716. Each of these six dials 711-716 has five settings, which correspond to five bins for the respective combination metric associated with each dial. In some examples, and as shown, the user interface can a visual list 720 (e.g., scrollable) of the song 721, 722, 723 of the library and can include details of each song, such as the chill moments plot 731, as shown, and/or additional values of the various metrics that have been calculated. In operation, a user can enable and disable each dial on demand and, when enabled, set the dial to one of the five positions, each representing a respective distribution of the combination metric. Enabling a dial can, for example, reduce the list of songs to include only those within the selected bin. This is shown, for example, in FIG. 8 where the Smooth/Rough dial is enabled (indicated as dial 711') and set to position (e.g., bin) two.

Figure 8:
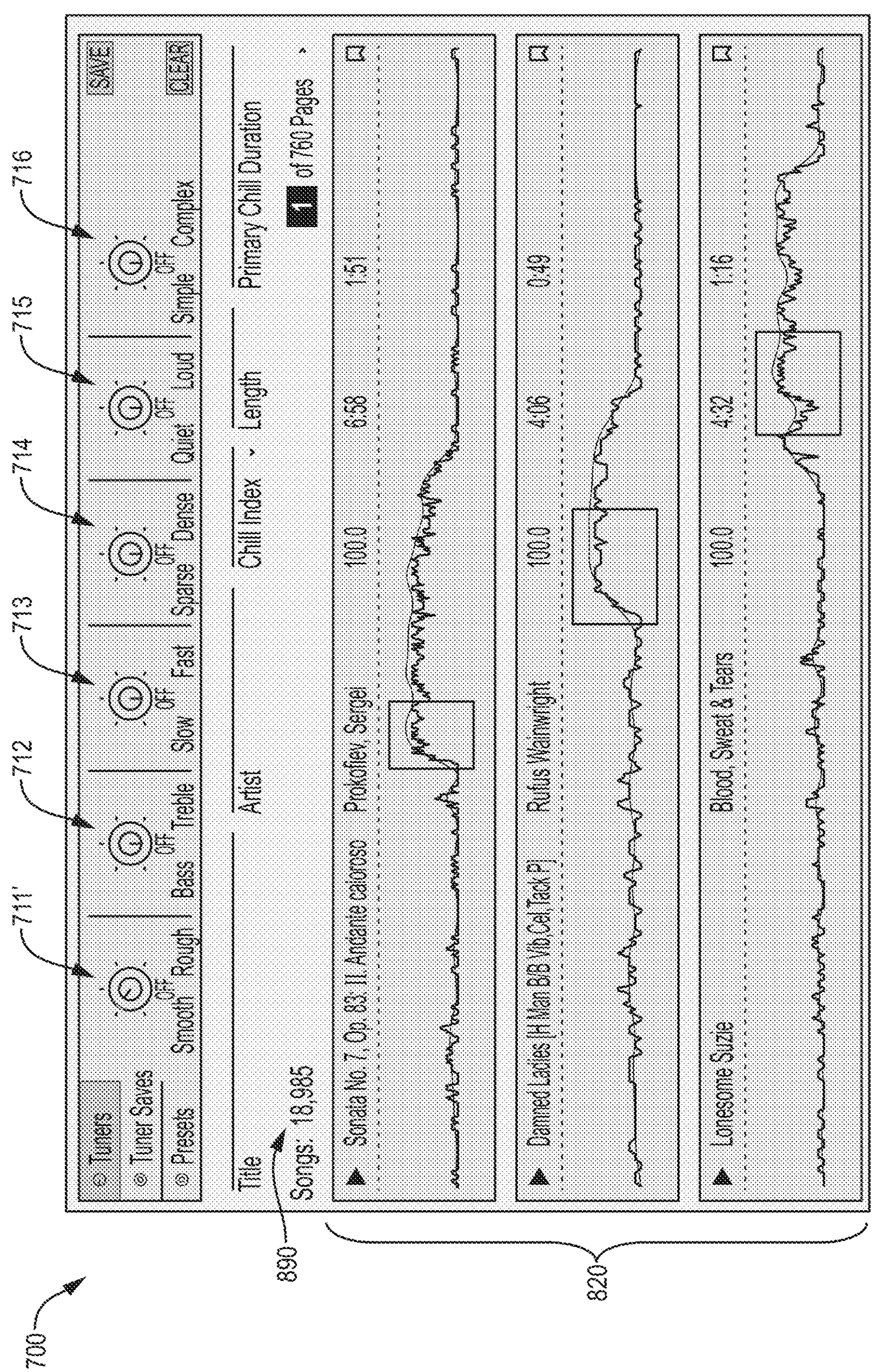
FIG. 8 is a graphical user interface example of the result of a filtering operation on the library of FIG. 7 using a perceptually-binned filtering dial according to examples of the present disclosure.
Figure 9:
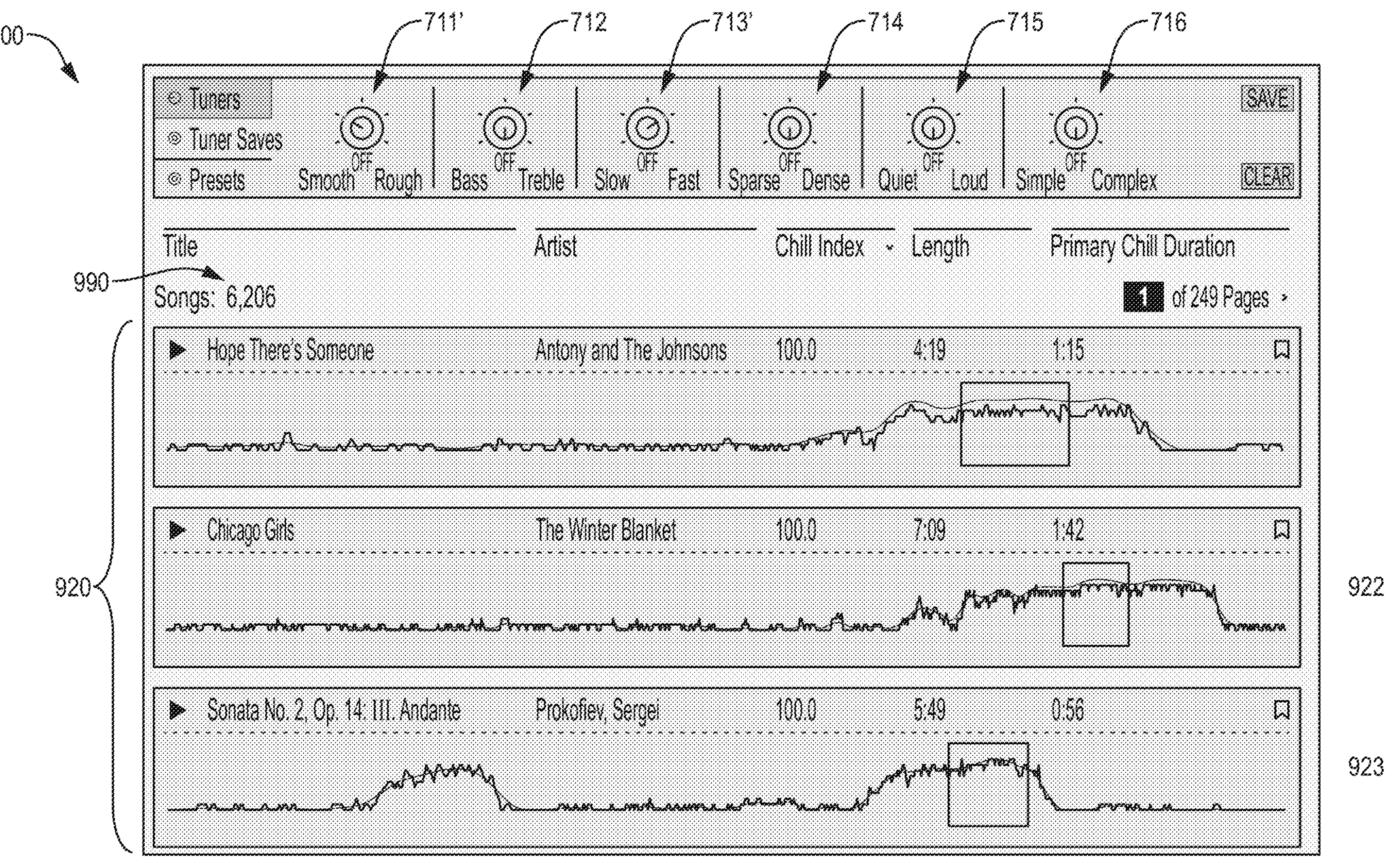
FIG. 9 is a graphical user interface example of the result of a filtering operation on the library of FIG. 7 using two perceptually-binned filtering dials according to examples of the present disclosure.
Figure 10:
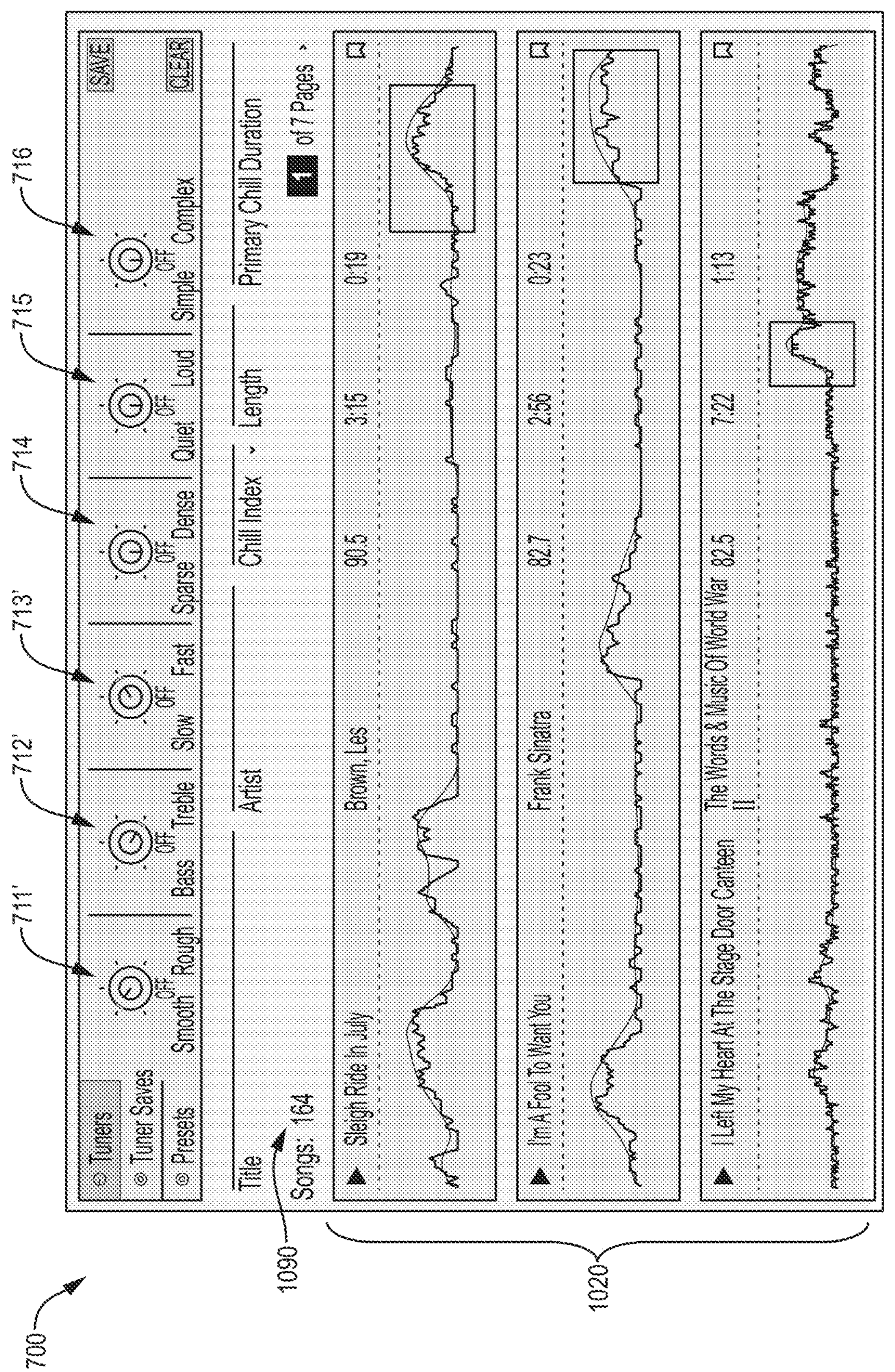
FIG. 10 is a graphical user interface example of the result of a filtering operation on the library of FIG. 7 using three perceptually-binned filtering dials according to aspects of the present disclosure.

FIG. 8 shows that the list 820 of songs 890 present in this second bin of the Smooth/Rough combination metric 711' is 18,985. Users can further sort and filter this list according to known techniques and according to the specific result of the Smooth/Rough combination metric. Moreover, uses can enable additional dials 711-716 to filter the library further. FIG. 9 shows a second dial, specifically the Slow/Fast dial 713, being enabled (indicated as 713') and set to position four. The resultant list 920 of songs 990 is now reduced to 6,206, indicating that of the 18,985 songs present in Bin 2 of the Smooth/Rough distribution, 6,206 are also present in Bin 4 of the Slow/Fast distribution. Finally, FIG. 10 shows a third dial, specifically the Bass/Treble dial 712, enabled (indicated as 712') and set to the fifth position. The resultant list 1020 of songs 1090 is trimmed to 164 songs, indicating that of the 6,206 songs present in both the second bin of the Smooth/Rough distribution and the fourth bin of the Slow/Fast distribution, 164 of those 6,206 songs are also present in the fifth bin of the Bass/Treble distribution. Accordingly, the resultant list of 164 represents songs that are perceptually smoother than the library average (but not extremely smooth), faster than the library average (but not extremely fast), and are extremely treble focused compared to the library average.

Additionally, examples of the present disclosure include the use of Chill Plot data, details of which are provided in International Patent Application No. PCT/US2022/033597, entitled "SYSTEMS AND METHODS FOR IDENTIFYING SEGMENTS OF MUSIC HAVING CHARACTERISTICS SUITABLE FOR INDUCING AUTONOMIC PHYSIOLOGICAL RESPONSES," and filed Jun. 15, 2022, and the content of which is incorporated by reference herein in its entirety (hereinafter 'the '597 application').

Examples of the method described include using chill phrases and chill plot data as generated by the systems and methods described the '597 application. Examples of the present disclosure include the use of a whole song as the input for analysis, or shorter segments of a song can be used as the input. This can be advantageous because, typically, sub-metrics used as components for creating a composite metric are derived as average values for the entire song, however the average value may not be representative of the typical value found in the song. For example, a song might have an average dissonance value of 0.5 when in reality the dissonance of the song alternates exclusively between local values of 0.1 and 0.9 (e.g., there are no sections of the song that are actually 0.5). By applying the methods of the present disclosure to the one or more chill phrases as described in the '597 application (e.g., excluding segments outside of the detected chill phrases), a composite metric dial with 5 bins that accurately represent the audio phenomenon occurring within that chill phrase of the song more precisely.

2. Metrics derived from various analyses of the chill plot of patent 1 can be used as input metrics for the methods of creating composite metrics as described in the current patent. For example, a complexity metric might use the variance value of the chill plot data as one of its input metrics.

3. The methods described in the current patent could be applied to the generation of the chill plot itself by tuning the underlying analysis methods applied to the metrics that make up the chill plot. For example, the data for a component metric of the chill plot is often min-max re-scaled without respect for any possible human perception factors. By performing this re-scaling step using the perception binning methods as described in the current patent, the accuracy of the generated chill plot could be improved.

Computer Systems and Cloud-based Implementations

Figure 11:
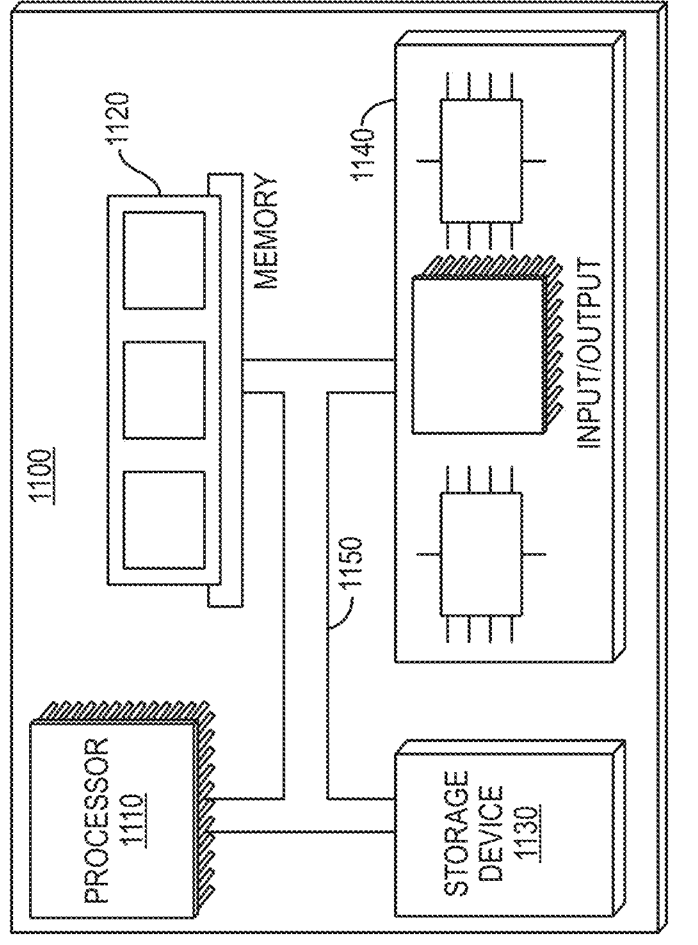
FIG. 11 is a block diagram of one exemplary embodiment of a computer system for use in conjunction with the present disclosure.

FIG. 11 is a block diagram of one exemplary embodiment of a computer system 1100 upon which the present disclosures can be built, performed, trained, etc. For example, referring to FIGS. 1 to 10, any modules or systems can be examples of the composite generate process 600 described herein. The system 1100 can include a processor 1110, a memory 1120, a storage device 1130, and an input/output device 1140. Each of the components 1110, 1120, 1130, and 1140 can be interconnected, for example, using a system bus 1150. The processor 1110 can be capable of processing instructions for execution within the system 1100. The processor 1110 can be a single-threaded processor, a multi-threaded processor, or similar device. The processor 1110 can be capable of processing instructions stored in the memory 1120 or on the storage device 1130. The processor 1110 may execute operations such as a) executing an audio processing metric, b) re-scaling the distribution of a plurality of outputs of audio processing metrics, c) executing a composite metric based on the re-scaled distributions of two or more audio processing metrics, d) executing filtering or search operation on an digital audio library using a selection of bins in one or more composite metrics, e) storing output data from any of the metrics and algorithms disclosed herein, f) receiving a digital music file, g) outputting data from any of the metrics and algorithms disclosed herein, h) generating and/or outputting a distribution bin for a rescaled audio metric distribution, i) receiving a user request for data from any of the metrics and algorithms disclosed here and outputting a result, and j) operating a display device of a computer system, such as a mobile device, to visually present data from any of the metrics and algorithms disclosed herein, among other features described in conjunction with the present disclosure.

The memory 1120 can store information within the system 1100. In some implementations, the memory 1120 can be a computer-readable medium. The memory 1120 can, for example, be a volatile memory unit or a non-volatile memory unit. In some implementations, the memory 1120 can store information related functions for executing objective audio processing metrics and any algorithms disclosed herein. The memory 1120 can also store digital audio data as well as outputs from objective audio processing metrics and any algorithms disclosed herein.

The storage device 1130 can be capable of providing mass storage for the system 1100. In some implementations, the storage device 1130 can be a non-transitory computer-readable medium. The storage device 1130 can include, for example, a hard disk device, an optical disk device, a solid-state drive, a flash drive, magnetic tape, and/or some other large capacity storage device. The storage device 1130 may alternatively be a cloud storage device, e.g., a logical storage device including multiple physical storage devices distributed on a network and accessed using a network. In some implementations, the information stored on the memory 1120 can also (or instead) be stored on the storage device 1130.

The input/output device 1140 can provide input/output operations for the system 1100. In some implementations, the input/output device 1140 can include one or more of the following: a network interface device (e.g., an Ethernet card or an Infiniband interconnect), a serial communication device (e.g., an RS-232 10 port), and/or a wireless interface device (e.g., a short-range wireless communication device, an 802.7 card, a 3G wireless modem, a 4G wireless modem, a 5G wireless modem). In some implementations, the input/output device 1140 can include driver devices configured to receive input data and send output data to other input/output devices, e.g., a keyboard, a printer, and/or display devices. In some implementations, mobile computing devices, mobile communication devices, and other devices can be used.

In some implementations, the system 1100 can be a microcontroller. A microcontroller is a device that contains multiple elements of a computer system in a single electronics package. For example, the single electronics package could contain the processor 1110, the memory 1120, the storage device 1130, and/or input/output devices 1140.

Figure 12:
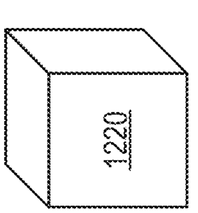
FIG. 12 is a block diagram of one exemplary embodiment of a cloud-based computer network for use in conjunction with the present disclosure.
Figure 12:
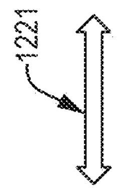
Figure 12:
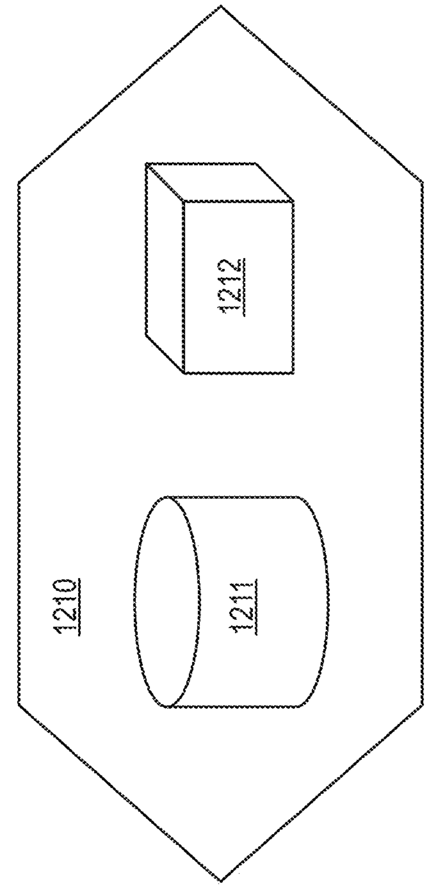
Figure 12:
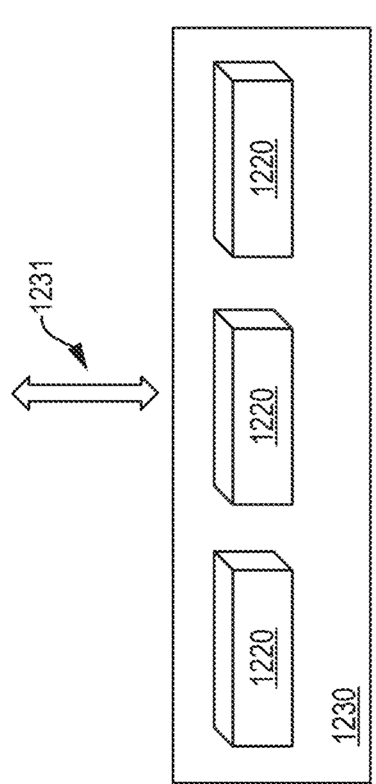

FIG. 12 is a block diagram of one exemplary embodiment of a cloud-based computer network 1210 for use in conjunction with the present disclosures. The cloud-based computer network 1210 can include a digital storage service 1211 and a processing service 1212, each of which can be provisioned by one or more individual computer processing and storage devices located in one or more physical locations. The cloud-based computer network 1210 can send and receive 1221, 1231, via the internet or other digital connection means, data from individual computer systems 1220 (e.g., a personal computer or mobile device) as well as from networks 1230 of individual computer systems 1220 (e.g., a server operating a music streaming service). The cloud-based computer network 1210 may facilitate or complete the execution of operations such as a) executing an audio processing metric, b) re-scaling the distribution of a plurality of outputs of audio processing metrics, c) executing a composite metric based on the re-scaled distributions of two or more audio processing metrics, d) executing filtering or search operation on an digital audio library using a selection of bins in one or more composite metrics, c) storing output data from any of the metrics and algorithms disclosed herein, f) receiving a digital music file, g) outputting data from any of the metrics and algorithms disclosed herein, h) generating and/or outputting a distribution bin for a rescaled audio metric distribution, i) receiving a user request for data from any of the metrics and algorithms disclosed here and outputting a result, and j) operating a display device of a computer system, such as a mobile device, to visually present data from any of the metrics and algorithms disclosed herein, among other features described in conjunction with the present disclosure.

Although an example processing system has been described above, implementations of the subject matter and the functional operations described above can be implemented in other types of digital electronic circuitry, or in computer software, firmware, or hardware, including the structures disclosed in this specification and their structural equivalents, or in combinations of one or more of them. Implementations of the subject matter described in this specification can be implemented as one or more computer program products, i.e., one or more modules of computer program instructions encoded on a tangible program carrier, for example, a computer-readable medium, for execution by, or to control the operation of, a processing system. The computer readable medium can be a machine-readable storage device, a machine-readable storage substrate, a memory device, a composition of matter effecting a machine-readable propagated signal, or a combination of one or more of them.

Various embodiments of the present disclosure may be implemented at least in part in any conventional computer programming language. For example, some embodiments may be implemented in a procedural programming language (e.g., "C" or ForTran95), or in an object-oriented programming language (e.g., "C++"). Other embodiments may be implemented as a pre-configured, stand-alone hardware element and/or as preprogrammed hardware elements (e.g., application specific integrated circuits, FPGAs, and digital signal processors), or other related components.

The term "computer system" may encompass all apparatus, devices, and machines for processing data, including, by way of non-limiting examples, a programmable processor, a computer, or multiple processors or computers. A processing system can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, executable logic, or code) can be written in any form of programming language, including compiled or interpreted languages, or declarative or procedural languages, and it can be deployed in any form, including as a standalone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

Such implementation may include a series of computer instructions fixed either on a tangible, non-transitory medium, such as a computer readable medium. The series of computer instructions can embody all or part of the functionality previously described herein with respect to the system. Computer readable media suitable for storing computer program instructions and data include all forms of non-volatile or volatile memory, media and memory devices, including by way of example, semiconductor memory devices, e.g., EPROM, EEPROM, and flash memory devices; magnetic disks, e.g., internal hard disks or removable disks or magnetic tapes; magneto optical disks; and CD-ROM and DVD-ROM disks. The processor and the memory can be supplemented by, or incorporated in, special purpose logic circuitry. The components of the system can be interconnected by any form or medium of digital data communication, e.g., a communication network. Examples of communication networks include a local area network ("LAN") and a wide area network ("WAN"), e.g., the Internet.

Those skilled in the art should appreciate that such computer instructions can be written in a number of programming languages for use with many computer architectures or operating systems. Furthermore, such instructions may be stored in any memory device, such as semiconductor, magnetic, optical, or other memory devices, and may be transmitted using any communications technology, such as optical, infrared, microwave, or other transmission technologies.

Among other ways, such a computer program product may be distributed as a removable medium with accompanying printed or electronic documentation (e.g., shrink wrapped software), preloaded with a computer system (e.g., on system ROM or fixed disk), or distributed from a server or electronic bulletin board over the network (e.g., the Internet or World Wide Web). In fact, some embodiments may be implemented in a software-as-a-service model ("SAAS") or cloud computing model. Of course, some embodiments of the present disclosure may be implemented as a combination of both software (e.g., a computer program product) and hardware. Still other embodiments of the present disclosure are implemented as entirely hardware, or entirely software.

Examples of the present disclosure include:

1. A method of generating perceptually filterable music libraries, the method comprising:

processing, using a processor, a plurality of digital audio files using a first objective audio processing metric to generate a first output for each of the plurality of digital audio files, the first output comprising a value of the first objective audio processing metric;

processing, using a processor, the plurality of digital audio files using a second objective audio processing metric to generate a second output for each of the plurality of digital audio files, the second output comprising a value of the second objective audio processing metric;

generating first normalized outputs by rescaling a range of the first outputs of the plurality of digital audio files;

generating second normalized outputs by rescaling a range of the second outputs of the plurality of digital audio files;

calculating a first plurality of distribution bins of the first normalized outputs based on a distribution of the first normalized outputs in the plurality of digital audio files;

calculating a second plurality of distribution bins of the second normalized outputs based on a distribution of the second normalized outputs in the plurality of digital audio files;

generating a first intermediate value for each of the plurality of digital audio files by separating mapping, for each of the first plurality of distribution bins, values of the first normalized outputs to a new value based on a relative size of a respective distribution bin of the first plurality of distribution bins;

generating a second intermediate value for each of the plurality of digital audio files by separating mapping, for each of the second plurality of distribution bins, values of the second normalized outputs to a new value based on a relative size of a respective distribution bin of the second plurality of distribution bins;

generating a composite metric value for each of the plurality of digital audio files by combining the first and second intermediate values of the plurality of digital audio files; and calculating a plurality of distribution bins of the composite metric values for the plurality of digital audio files based on a distribution of the composite metric value in the plurality of digital audio files;

wherein the first and second object audio processing algorithms are related to a same perceptual acoustic characteristic.

2. The method of example 1, or any suitable examples herein, wherein the first and second normalized ranges have a same range.

3. The method of example 1, or any suitable examples herein, wherein the first plurality of distribution bins and the second plurality of distribution bins have the same number of bins.

4. The method of example 3, or any suitable examples herein, wherein the distribution bins of the composite metric have the same number of bins as the first and second plurality.

5. The method of example 4, or any suitable examples herein, wherein the first plurality of distribution bins and the second plurality of distribution bins each have 3 or more bins.

6. The method of any of examples 1 to 5, or any suitable examples herein, wherein calculating the first plurality of distribution bins is further based on a pre-determined human perception of the first objective audio processing metric.

7. The method of any of examples 1 to 6, or any suitable examples herein, wherein the calculating the first plurality of distribution bins comprises determining a number of the bins of the first plurality of distribution bins and a range of each of the first plurality of distribution bins.

8. The method of example 6, or any suitable examples herein, wherein calculating a segmentation of the second plurality of distribution bins is further based on a pre-determined human perception of the second objective audio processing metric.

9. The method of examples 6, or any suitable examples herein, wherein at least one of the first plurality of distribution bins or the second plurality of distribution bins are non-overlapping.

10. The method of example 9, or any suitable examples herein, wherein the distribution bins of the composite metric do not overlap.

11. The method of claim 1, wherein at least one of the first plurality of distribution bins, the second plurality of distribution bins, or the distribution bins of the composite metric overlap such that values are found in at most 2 adjacent bins.

12. The method of any of examples 1 to 11, or any suitable examples herein, where combining the first and second intermediate values of the plurality of digital audio files comprises equally combining the first and second intermediate values.

13. The method of any of examples 1 to 12, or any suitable examples herein, where combining the first and second intermediate values of the plurality of digital audio files comprises unequally combining the first and second intermediate values.

14. The method of any of examples 1 to 13, or any suitable examples herein, further comprising:

before generating first normalized outputs, applying a practical range filter to a distribution of the first output, the practical range filter comprising at least one of an upper limit or a lower limit on the value of the first objective audio processing metric, and wherein rescaling a range of the first outputs is done within the practical range filter such that values of the first objective audio processing metric above the upper limit are re-scaled at the upper limit and values of the first objective audio processing metric below the lower limit are rescaled at the lower limit.

15. A method of generating perceptually filterable music libraries, the method comprising:

processing, using a processor, a plurality of digital audio files using a first objective audio processing metric to generate a first output for each of the plurality of digital audio files, the first output comprising a value of the first objective audio processing metric;

processing, using a processor, the plurality of digital audio files using a second objective audio processing metric to generate a second output for each of the plurality of digital audio files, the second output comprising a value of the second objective audio processing metric;

generating first normalized outputs by rescaling a range of the first outputs of the plurality of digital audio files;

generating second normalized outputs by rescaling a range of the second outputs of the plurality of digital audio files such that the first and second normalized ranges have a same range;

calculating a first plurality of distribution bins of the first normalized outputs based on a distribution of the first normalized outputs in the plurality of digital audio files and human perception of the first objective audio processing metric;

calculating a second plurality of distribution bins of the second normalized outputs based on a distribution of the second normalized outputs in the plurality of digital audio files and human perception of the second objective audio processing metric, the second plurality having a same number of bins as the first plurality;

generating a first intermediate value for each of the plurality of digital audio files by separating mapping, for each of the first plurality of distribution bins, values of the first normalized outputs to a new value based on a relative size of a respective distribution bin, generating a second intermediate value for each of the plurality of digital audio files by separating mapping, for each of the second plurality of distribution bins, values of the second normalized outputs to a new value based on a relative size of a respective distribution bin, generating a composite metric value for each of the plurality of digital audio files by combining the first and second intermediate values of the plurality of digital audio files; and calculating a plurality of distribution bins of the composite metric values for the plurality of digital audio files based on a distribution of the composite metric value in the plurality of digital audio files;

wherein the first and second object audio processing algorithms are related to a same perceptual acoustic characteristic.

16. A computer implemented method of operating a user interface on a display for interacting with a large digital audio library, the method comprising:

causing a display to present a user interface to a user, the user interface comprising:

a plurality of selectable filtering dials, each filtering dial having an off state and an on state and a plurality of selectable positions, the selectable positions being active when the dial is in the on state and disabled when the dial is in the off state;

an interactive list of at least a portion of the digital audio files present in the large digital audio library;

wherein the large digital audio library comprises a database including a value for each of a plurality of different objective audio metrics for each digital audio files present in the large digital audio library;

wherein each of the plurality of selectable filtering dials corresponds to a different composite objective audio metric, each composite objective audio metric representing a perceptually distinct audio quality calculated based on combined distributions of the values of two or more of the objective audio metrics in the large digital audio library;

wherein each of the plurality of selective positions corresponds to a distinct distribution bin of values of the composite objective audio metric;

wherein each of the plurality of selectable filtering dials are configured such that when the each filtering dial is set to the on state, the interactive list is filtered to only include digital audio files having values of the corresponding composite metrics present in the distinct distribution bin corresponding to the selective position of the filtering dial.

One skilled in the art will appreciate further features and advantages of the disclosures based on the provided for descriptions and embodiments. Accordingly, the inventions are not to be limited by what has been particularly shown and described. For example, although the present disclosure provides for processing digital music data, the present disclosures can also be applied to other types of audio data, such as speech or environmental noise. All publications and references cited herein are expressly incorporated herein by reference in their entirety.

What is claimed is:

1. A method of generating perceptually filterable music libraries, the method comprising:

processing, using a processor, a plurality of digital audio files using a first objective audio processing metric to generate a first output for each of the plurality of digital audio files, the first output comprising a value of the first objective audio processing metric;

processing, using a processor, the plurality of digital audio files using a second objective audio processing metric to generate a second output for each of the plurality of digital audio files, the second output comprising a value of the second objective audio processing metric;

generating first normalized outputs by rescaling a range of the first outputs of the plurality of digital audio files;

generating second normalized outputs by rescaling a range of the second outputs of the plurality of digital audio files;

calculating a first plurality of distribution bins of the first normalized outputs based on a distribution of the first normalized outputs in the plurality of digital audio files;

calculating a second plurality of distribution bins of the second normalized outputs based on a distribution of the second normalized outputs in the plurality of digital audio files;

generating a first intermediate value for each of the plurality of digital audio files by separating mapping, for each of the first plurality of distribution bins, values of the first normalized outputs to a new value based on a relative size of a respective distribution bin of the first plurality of distribution bins;

generating a second intermediate value for each of the plurality of digital audio files by separating mapping, for each of the second plurality of distribution bins, values of the second normalized outputs to a new value based on a relative size of a respective distribution bin of the second plurality of distribution bins;

generating a composite metric value for each of the plurality of digital audio files by combining the first and second intermediate values of the plurality of digital audio files; and calculating a plurality of distribution bins of the composite metric values for the plurality of digital audio files based on a distribution of the composite metric value in the plurality of digital audio files;

wherein the first and second object audio processing algorithms are related to a same perceptual acoustic characteristic.

2. The method of claim 1, wherein the first and second normalized ranges have a same range.

3. The method of claim 1, wherein the first plurality of distribution bins and the second plurality of distribution bins have the same number of bins.

4. The method of claim 3, wherein the distribution bins of the composite metric have the same number of bins as the first and second plurality.

5. The method of claim 4, wherein the first plurality of distribution bins and the second plurality of distribution bins each have 3 or more bins.

6. The method of claim 1, wherein calculating the first plurality of distribution bins is further based on a pre-determined human perception of the first objective audio processing metric.

7. The method of claim 6, wherein the calculating the first plurality of distribution bins comprises determining a number of the bins of the first plurality of distribution bins and a range of each of the first plurality of distribution bins.

8. The method of claim 6, wherein calculating a segmentation of the second plurality of distribution bins is further based on a pre-determined human perception of the second objective audio processing metric.

9. The method of claim 7, wherein at least one of the first plurality of distribution bins or the second plurality of distribution bins are non-overlapping.

10. The method of claim 9, wherein the distribution bins of the composite metric do not overlap.

11. The method of claim 1, wherein at least one of the first plurality of distribution bins, the second plurality of distribution bins, or the distribution bins of the composite metric overlap such that values are found in at most 2 adjacent bins.

12. The method of claim 1, where combining the first and second intermediate values of the plurality of digital audio files comprises equally combining the first and second intermediate values.

13. The method of claim 1, where combining the first and second intermediate values of the plurality of digital audio files comprises unequally combining the first and second intermediate values.

14. The method of claim 1, further comprising:

before generating first normalized outputs, applying a practical range filter to a distribution of the first output, the practical range filter comprising at least one of an upper limit or a lower limit on the value of the first objective audio processing metric, and wherein rescaling a range of the first outputs is done within the practical range filter such that values of the first objective audio processing metric above the upper limit are re-scaled at the upper limit and values of the first objective audio processing metric below the lower limit are rescaled at the lower limit.

15. A method of generating perceptually filterable music libraries, the method comprising:

processing, using a processor, a plurality of digital audio files using a first objective audio processing metric to generate a first output for each of the plurality of digital audio files, the first output comprising a value of the first objective audio processing metric;

processing, using a processor, the plurality of digital audio files using a second objective audio processing metric to generate a second output for each of the plurality of digital audio files, the second output comprising a value of the second objective audio processing metric;

generating first normalized outputs by rescaling a range of the first outputs of the plurality of digital audio files;

generating second normalized outputs by rescaling a range of the second outputs of the plurality of digital audio files such that the first and second normalized ranges have a same range;

calculating a first plurality of distribution bins of the first normalized outputs based on a distribution of the first normalized outputs in the plurality of digital audio files and human perception of the first objective audio processing metric;

calculating a second plurality of distribution bins of the second normalized outputs based on a distribution of the second normalized outputs in the plurality of digital audio files and human perception of the second objective audio processing metric, the second plurality having a same number of bins as the first plurality;

generating a first intermediate value for each of the plurality of digital audio files by separating mapping, for each of the first plurality of distribution bins, values of the first normalized outputs to a new value based on a relative size of a respective distribution bin, generating a second intermediate value for each of the plurality of digital audio files by separating mapping, for each of the second plurality of distribution bins, values of the second normalized outputs to a new value based on a relative size of a respective distribution bin, generating a composite metric value for each of the plurality of digital audio files by combining the first and second intermediate values of the plurality of digital audio files; and calculating a plurality of distribution bins of the composite metric values for the plurality of digital audio files based on a distribution of the composite metric value in the plurality of digital audio files;

wherein the first and second object audio processing algorithms are related to a same perceptual acoustic characteristic.

16. A computer implemented method of operating a user interface on a display for interacting with a large digital audio library, the method comprising:

causing a display to present a user interface to a user, the user interface comprising:

a plurality of selectable filtering dials, each filtering dial having an off state and an on state and a plurality of selectable positions, the selectable positions being active when the dial is in the on state and disabled when the dial is in the off state; and an interactive list of at least a portion of the digital audio files present in the large digital audio library;

wherein the large digital audio library comprises a database including a value for each of a plurality of different objective audio metrics for each digital audio files present in the large digital audio library;

wherein each of the plurality of selectable filtering dials corresponds to a different composite objective audio metric, each composite objective audio metric representing a perceptually distinct audio quality calculated based on combined distributions of the values of two or more of the objective audio metrics in the large digital audio library;

wherein each of the plurality of selective positions corresponds to a distinct distribution bin of values of the composite objective audio metric; and wherein each of the plurality of selectable filtering dials are configured such that when the each filtering dial is set to the on state, the interactive list is filtered to only include digital audio files having values of the corresponding composite metrics present in the distinct distribution bin corresponding to the selective position of the filtering dial.

* * * * *